(12) United States Patent
Haque et al.

(10) Patent No.: US 11,374,599 B2
(45) Date of Patent: Jun. 28, 2022

(54) CIRCUITS FOR IDENTIFYING INTERFERERS USING COMPRESSED-SAMPLING

(71) Applicants: Tanbir Haque, Jackson Heights, NY (US); Peter R. Kinget, Summit, NJ (US); Matthew W. Bajor, Bayonne, NJ (US)

(72) Inventors: Tanbir Haque, Jackson Heights, NY (US); Peter R. Kinget, Summit, NJ (US); Matthew W. Bajor, Bayonne, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 343 days.

(21) Appl. No.: 16/331,086

(22) PCT Filed: Oct. 23, 2017

(86) PCT No.: PCT/US2017/057923
§ 371 (c)(1),
(2) Date: Mar. 6, 2019

(87) PCT Pub. No.: WO2018/076022
PCT Pub. Date: Apr. 26, 2018

(65) Prior Publication Data
US 2021/0297098 A1   Sep. 23, 2021

Related U.S. Application Data

(60) Provisional application No. 62/411,626, filed on Oct. 23, 2016.

(51) Int. Cl.
*H04B 1/10*   (2006.01)
*H04B 1/16*   (2006.01)

(52) U.S. Cl.
CPC ................. *H04B 1/10* (2013.01); *H04B 1/16* (2013.01)

(58) Field of Classification Search
CPC .................................. H04B 1/10; H04B 1/16
(Continued)

(56) References Cited

U.S. PATENT DOCUMENTS 5,001,441 A   3/1991   Gen-Kuong
5,629,956 A   5/1997   Durrant et al.
(Continued)

FOREIGN PATENT DOCUMENTS

EP           2662706        9/2015
WO      WO 2013152022      10/2013

OTHER PUBLICATIONS

Adams, D., et al., "A Mixer Frontend for a Four-Channel Modulated Wideband Converter with 62 dB Blocker Rejection", In IEEE Radio Frequency Integrated Circuits Symposium (RFIC), San Francisco, CA, US, May 22-24, 2016, pp. 286-289.
(Continued)

*Primary Examiner* — Don N Vo
(74) *Attorney, Agent, or Firm* — Byrne Poh LLP

(57) ABSTRACT

Circuits for identifying interferers using compressed-sampling, comprising: a low noise amplifier (LNA); a passive mixer having a first input coupled to an output of the LNA; a local oscillator (LO) source having an output coupled to a second input of the passive mixer; a low pass filter having an input coupled to an output of the passive mixer; an analog-to-digital converter (ADC) having an input coupled to the output of the low pass filter; a digital baseband (DBB) circuit having an input coupled to an output of the ADC; and a compression-sampling digital-signal-processor (DSP) having an input coupled to the output of the DBB circuit, wherein the compression-sampling DSP is configured to
(Continued)

output identifiers of frequency locations of interferers, wherein, in a first mode, the LO source outputs a modulated LO signal that is formed by modulating an LO signal with a pseudo-random sequence.

24 Claims, 12 Drawing Sheets

(58) Field of Classification Search
USPC .......................................... 375/346; 455/296
See application file for complete search history.

(56) References Cited

U.S. PATENT DOCUMENTS

| | | | |
|---|---|---|---|
| 5,640,416 | A | 6/1997 | Chalmers |
| 6,163,696 | A | 12/2000 | Bi et al. |
| 6,351,290 | B1 | 2/2002 | Limberg |
| 6,621,804 | B1 | 9/2003 | Holtzman et al. |
| 6,882,834 | B1 | 4/2005 | Balboni |
| 7,103,316 | B1 | 9/2006 | Hall |
| 7,266,360 | B2 | 9/2007 | Kang et al. |
| 7,787,852 | B2 | 8/2010 | Rofougaran |
| 8,166,084 | B2 | 4/2012 | Hahn et al. |
| 8,285,243 | B2 | 10/2012 | Kang et al. |
| 8,391,340 | B2 | 3/2013 | Weill |
| 8,457,579 | B2 | 6/2013 | Mishali et al. |
| 8,571,504 | B2 | 10/2013 | Robert et al. |
| 8,594,603 | B2 | 11/2013 | Balankutty et al. |
| 8,629,714 | B2 | 1/2014 | Ng et al. |
| 8,761,065 | B2 | 6/2014 | Stephens et al. |
| 8,836,557 | B2 | 9/2014 | Eldar et al. |
| 8,971,911 | B2 | 3/2015 | Barnawi |
| 9,065,504 | B2 | 6/2015 | Kwon et al. |
| 9,191,891 | B2 | 11/2015 | Jafarian et al. |
| 9,413,420 | B1 | 8/2016 | Kong |
| 2001/0041548 | A1 | 11/2001 | Bult et al. |
| 2004/0266356 | A1 | 12/2004 | Javor et al. |
| 2006/0222116 | A1 | 1/2006 | Hughes et al. |
| 2006/0103362 | A1 | 5/2006 | Eberlein |
| 2006/0153155 | A1 | 7/2006 | Jacobsen et al. |
| 2006/0198474 | A1 | 9/2006 | Sorrells et al. |
| 2008/0069183 | A1 | 3/2008 | Terada |
| 2008/0108318 | A1 | 5/2008 | Min et al. |
| 2008/0214139 | A1 | 9/2008 | Conta et al. |
| 2009/0066446 | A1 | 3/2009 | Sahu et al. |
| 2009/0267655 | A1 | 10/2009 | Chen et al. |
| 2009/0323779 | A1 | 12/2009 | Lennen |
| 2010/0302100 | A1 | 12/2010 | Yang et al. |
| 2011/0007780 | A1 | 1/2011 | Shimoni |
| 2011/0221518 | A1 | 9/2011 | Romero |
| 2012/0235801 | A1 | 9/2012 | Cho et al. |
| 2012/0249234 | A1 | 10/2012 | Robert et al. |
| 2012/0252394 | A1 | 10/2012 | Balakrishnan et al. |
| 2012/0314822 | A1 | 12/2012 | Gupta |
| 2013/0136154 | A1 | 5/2013 | Chomal et al. |
| 2013/0149983 | A1 | 6/2013 | Fahim et al. |
| 2013/0286903 | A1 | 10/2013 | Khojastepour et al. |
| 2013/0336368 | A1 | 12/2013 | Arima et al. |
| 2014/0070987 | A1 | 3/2014 | Jarvis et al. |
| 2014/0099901 | A1 | 4/2014 | Ruegamer et al. |
| 2014/0269849 | A1 | 9/2014 | Abdelmonem et al. |
| 2014/0323071 | A1 | 10/2014 | Liao |
| 2014/0370833 | A1 | 12/2014 | Din et al. |
| 2015/0072635 | A1 | 3/2015 | Atalla et al. |
| 2015/0105067 | A1 | 4/2015 | Vallaippan |
| 2016/0211872 | A1 | 7/2016 | Sim et al. |
| 2017/0026066 | A1* | 1/2017 | Kinget ............... H04B 17/345 |

OTHER PUBLICATIONS

Agilent Technologies, "Fundamentals of RF and Microwave Noise Figure Measurements", Technical Paper, Application Note 57-1, Aug. 5, 2010, pp. 1-31.

Agilent Technologies, "Spectrum Analysis Basics", Technical Paper, Application Note 150, Feb. 25, 2014, pp. 1-89.

Alink, M.S.O., et al., "A 50MHz-to-1.5GHz Cross-Correlation CMOS Spectrum Analyzer for Cognitive Radio with 89dB SFDR in 1MHz RBW", In IEEE DySpan 2010, Singapore, SG, Apr. 2010, pp. 1-6.

Alink, M.S.O., et al., "A CMOS-Compatible Spectrum Analyzer for Cognitive Radio Exploiting Crosscorrelation to Improve Linearity and Noise Performance", In IEEE Transaction on Circuits and Systems-I, vol. 59, Mar. 2012, pp. 479-492.

Alink, M.S.O., et al., "Using Cross Correlation to Mitigate Analog/RF Impairments for Integrated Spectrum Analyzers", In IEEE Transaction on Microwave Theory and Techniques, vol. 61, No. 3, Mar. 2013, pp. 1327-1337.

Ammar, Y., et al., "An Ultra-Low Power Wake Up Receiver with Flip Flops Based Address Decoder", In the 12th International Multi-Conference on Systems, Signals & Devices (SSD), Sakiet Ezzit Sfax, Tunisia, Mar. 16-19, 2015, pp. 1-5.

Andrews, C. and Molnar, A., "A Passive Mixer-First Receiver With Digitally Controlled and Widely Tunable RF Interface", In IEEE Journal of Solid-State Circuits, vol. 45, No. 12, Dec. 2010, pp. 2696-2708.

Andrews, C. and Molnar, A., "A Passive-Mixer-First Receiver with Baseband-Controlled RF Impedance Matching, 6dB NF, and 27dBm Wideband IIP3", In IEEE International Solid-State Circuits Conference (ISSCC) Digest of Technical Papers, San Francisco, CA, US, Feb. 7-11, 2010, pp. 46-47.

Anttila, L., et al., "Circularity-Based I/Q Imbalance Compensation in Wideband Direct-Conversion Receivers", In IEEE Transactions on Vehicular Technology, vol. 57, No. 4, Jul. 2008, pp. 2099-2113.

Aparin, V., "A New Method of TX Leakage Cancelation in W/CDMA and GPS Receivers", In IEEE Proceedings of the Radio Frequency Integrated Circuits Symposium (RFIC '08), Digest of Technical Papers, Atlanta, GA, US, Jun. 15-17, 2008, pp. 87-90.

Aparin, V., et al., "An Integrated LMS Adaptive Filter of TX Leakage for CDMA Receiver Front Ends", In IEEE Journal of Solid-State Circuits, vol. 41, No. 5, May 2006, pp. 1171-1182.

Ayazian, S. and Gharpurey, R., "Feedforward Interference Cancellation in Radio Receiver Front-ends", In IEEE Transactions in Circuits and Systems II: Express Briefs, vol. 54, No. 10, Oct. 2007, pp. 902-906.

Bagheri, R., et al., "An 800-MHz-6-GHz Software-Defined Wireless Receiver in 90-nm CMOS", In IEEE Journal of Solid-State Circuits, vol. 41, No. 12, Dec. 2006, pp. 2860-2688.

Balankutty, A. and Kinget, P., "An Ultra-Low Voltage, Low-Noise, High Linearity 900-MHz Receiver With Digitally Calibrated In-Band Feed-Forward Interferer Cancellation in 65-nm CMOS", In IEEE Journal of Solid-State Circuits, vol. 46, No. 10, Oct. 2011, pp. 2268-2283.

Bardin, J. C., et al., "A 0.5-20 GHz Quadrature Downconverter", In IEEE Bipolar/BiCMOS Circuits and Technology Meeting (BCTM), Monterey, CA, US, Oct. 13-15, 2008, pp. 186-189.

Bdiri, S. and Derbel, F., "A Nanowatt Wake-Up Receiver for Industrial Production Line", In the 11th International Multi-Conference on Systems, Signals & Devices (SSD), Barcelona, ES, Feb. 11-14, 2014, pp. 1-6.

Bdiri, S. and Derbel, F., "An Ultra-Low Power Wake-Up Receiver for Real-Time Constrained Wireless Sensor Networks", In the AMA Conferences 2015—SENSOR 2015 and IRS 2015, Nuremberg, DE, May 19-21, 2015, pp. 612-617.

Blaakmeer, S.C., et al., "Wideband Balun-LNA With Simultaneous Output Balancing, Noise-Canceling and Distortion-Canceling", In IEEE Journal of Solid-State Circuits, vol. 43, No. 6, Jun. 2008, pp. 1341-1350.

Borremans, J., et al. "Low-area Active-feedback Low-noise Amplifier Design in Scaled Digital CMOS", In IEEE Journal of Solid-State Circuits, vol. 43, No. 11, Nov. 2008, pp. 2422-2433.

Braun, M., et al., "Signal Detection for Cognitive Radios with Smashed Filtering", In VTC Spring 2009—IEEE 69th Vehicular Technology Conference, Barcelona, ES, Apr. 26-29, 2009, pp. 1-5.

Bruccoleri, F., et al., "Wide-Band CMOS Low-Noise Amplifier Exploiting Thermal Noise Canceling", In IEEE Journal of Solid-State Circuits, vol. 39, No. 2, Feb. 2004, pp. 275-282.

(56) References Cited

OTHER PUBLICATIONS

Candes, E., et al., "Decoding by Linear Programming", In IEEE Transactions on Information Theory, vol. 51, No. 12, Dec. 2005, pp. 4203-4215.
Candes, E., et al., "Robust Uncertainty Principals: Signal Reconstruction from Highly Incomplete Frequency Information", In IEEE Transactions on Information Theory, vol. 52, No. 2, Feb. 2006, pp. 489-509.
Chen, R. and Hashemi, H., "A 0.5-to-3 GHz Software-Defined Radio Receiver using Sample Domain Signal Processing", In Proceedings of IEEE Radio Frequency Integrated Circuits Symposium (RFIC), Seattle, WA, US, Jun. 2-4, 2013, pp. 315-318.
Chen, X., et al., "A Sub-Nyquist Rate Compressive Sensing Data Acquisition Front-End", In IEEE Journal on Emerging and Selected Topics in Circuits and Systems, vol. 2, No. 3, Sep. 2012, pp. 542-551.
Cherry, E. and Hooper, D., "The Design of Wide-Band Transistor Feedback Amplifiers", In Proceedings of the Institution of Electrical Engineers, vol. 110, No. 2, Feb. 1963, pp. 375-389.
Darabi, H., "A Blocker Filtering Technique for SAW-Less Wireless Receivers", In IEEE Journal of Solid-State Circuits, vol. 42, No. 12, Dec. 2007, pp. 2766-2773.
Darabi, H., et al., "Highly Integrated and Tunable RF Front Ends for Reconfigurable Multiband Transceivers: A Tutorial", In IEEE Transactions on Circuits and Systems I: Regular Papers , vol. 58, No. 9, Sep. 2011, pp. 2038-2050.
Darvishi, M., et al., "A 0.1-to-1.2GHz Tunable 6th-Order N-Path Channel-Select Filter with 0.6dB Passband Ripple and +7dBm Blocker Tolerance", In IEEE International Solid-State Circuits Conference (ISSCC) Digest of Technical Papers, San Francisco, CA, US, Feb. 2013, pp. 172-174.
Davis, G., et al., "Adaptive Greedy Approximations", In Constructive Approximation, vol. 13, No. 1, Mar. 1997, pp. 57-98.
Dominguez-Jimenez, M.E., et al., "Analysis and Design of Multirate Synchronus Sampling Schemes for Sparse Multiband Signals", In the Proceedings of the 20th European Signal Processing Conference (EUSIPCO), Bucharest, RO, Aug. 27-31, 2012, pp. 1184-1188.
Donoho, D., "Compressive Sensing", Department of Statistics, Stanford University, Sep. 2004, pp. 1-34.
Donoho, D.L., "For Most Large Underdetermined Systems of Equations, the Minimal $1^{\wedge}1$ Norm Near Solution Approximates the Sparsest Solution", In Communications on Pure and Applied Mathematics, vol. 59, No. 7, Jul. 2006, pp. 907-934.
Durante, M.S. and Mahlknecht, S., "An Ultra-Low Power Wake-Up Receiver for Wireless Sensor Nodes", In Proceedings of the 3rd International Conference on Sensor Technologies and Applications (SENSORCOMM '09), Athens, GR, Jun. 18-23, 2009, pp. 167-170.
Fleyer, M., et al., "Multirate Synchronus Sampling of Sparse Multiband Signals", In IEEE Transactions on Signal Processing, vol. 58, No. 3, Mar. 2010, pp. 1144-1156.
Fong, K.L., "Dual-band High-linearity Variable-gain Low-noise Amplifiers for Wireless Applications", In IEEE International Solid-State Circuits Conference (ISSCC) Digest of Technical Papers, Feb. 1999, pp. 224-225.
Geis, A., et al., "A0.045mm2 0.1-6GHz Reconfigurable Multi-Band, Multi-Gain LNA for SDR", In Proceedings of IEEE Radio Frequency Integrated Circuits Symposium (RFIC), Anaheim, CA, US, May 23-25, 2010, pp. 123-126.
Ghaffari, A., et al., "8-Path Tunable RF Notch Filters for Blocker Suppression", In IEEE International Solid-State Circuits Conference (ISSCC) Digest of Technical Papers, Feb. 2012, pp. 76-78.
Ghaffari, A., et al., "Tunable High-Q N-Path Band-Pass Filters: Modeling and Verification", In IEEE Journal of Solid-State Circuits, vol. 46, No. 5, May 2011, pp. 1-29.
Ghaffari, A., et al., "Tunable N-path Notch Filters for Blocker Suppression: Modeling and Verification", In IEEE Journal of Solid-State Circuits, vol. 48, No. 6, Jun. 2013, pp. 1370-1382.
Giannini, V., et al., "A 2-mm 0.1-5 GHz Software-defined Radio Receiver in 45-nm Digital CMOS", In IEEE Journal of Solid-State Circuits, vol. 44, No. 12, Dec. 2009, pp. 3486-3498.
Goel, A., et al., "A 130-nm CMOS 100-Hz-6-GHz Reconfigurable Vector Signal Analyzer and Software-Defined Receiver", In IEEE Transactions on Microwave Theory and Techniques, May 2012, pp. 1-15.
Gold, R., "Optimal Binary Sequences for Spread Spectrum Mulitplexing (Correspondence)," In IEEE Transactions on Information Theory, vol. 13, Oct. 1967, pp. 619-621.
Han, H.G. and Kim, T.W., "A CMOS RF Programmable-Gain Amplifier for Digital TV With a + 9-dBm IIP3 Cross-Coupled Common-Gate LNA", In IEEE Transactions on Circuits and Systems II: Express Briefs , vol. 59, No. 9, Sep. 2012, pp. 543-547.
Haque, T., et al. "Theory and Design of a Quadrature Analog-to-lnformation Converter for Energy-Efficient Wideband Spectrum Sensing", In IEEE Transactions on Circuits and Systems I: Regular Papers, vol. 62, No. 2, Feb. 2015, pp. 527-535.
He, X. and Kundur, H., "A Compact SAW-less Multiband WCDMA/GPS Receiver Front-End with Translational Loop for Input Matching", In IEEE International Solid-State Circuits Conference (ISSCC) Digest of Technical Papers, Apr. 2011, pp. 372-374.
Hsu, C.W., et al., "A Sub-Sampling-Assisted Phase-Frequency Detector for Low-Noise PLLs With Robust Operation Under Supply Interference", In IEEE Transactions on Circuits and Systems I: Regular Papers, vol. 62, No. 1, Jan. 2015, pp. 90-99.
Hutu, F., et al., "A New Wake-Up Radio Architecture for Wireless Sensor Networks", In EURASIP Journal on Wireless Communications and Networking, vol. 1, No. 177, Dec. 2014, pp. 1-10.
Ingels, M., et al., "A 5mm2 40nm LP CMOS 0.1-to-3GHz Multistandard Transceiver", In IEEE Internation Solid-State Circuits Conference, San Francisco, CA, US, Feb. 7-11, 2010, pp. 458-459.
International Preliminary Report on Patentability of the International Searching Authority dated Mar. 14, 2017 in International Patent Application No. PCT/US2015/050058, pp. 1-10.
International Preliminary Reporton Patentability of the International Searching Authority dated Aug. 9, 2016 in International Patent Application No. PCT/US2015/015036, pp. 1-5.
International Search Report and Written Opinion of the International Searching Authority dated Jan. 4, 2018 in International Patent Application No. PCT/US2017/057923, pp. 1-38.
International Search Report and Written Opinion of the International Searching Authority dated Oct. 23, 2015 in International Patent Application No. PCT/US2015/015036, pp. 1-12.
International Search Report and Written Opinion of the International Searching Authority dated Dec. 22, 2015 in International Patent Application No. PCT/US2015/50058, pp. 1-11.
Izquierdo, C., et al., "Reconfigurable Wide-band Receiver with Positive Feed-back Translational Loop", In Proceedings of IEEE Radio Frequency Integrated Circuits Symposium (RFIC), Baltimore, MD, US, Jun. 5-7, 2011, pp. 1-4.
Izquierdo, C., et al., "Wide-band Receiver Architecture with Flexible Blocker Filtering Techniques", In Proceedings of IEEE International Conference on Electronics, Circuits, and Systems (ICECS), Athens, GR, Dec. 12-15, 2010, pp. 894-897.
Kaltiokallio, M., et al., "Wideband 2 to 6 GHz RF Front-end with Blocker Filtering", In IEEE Journal of Solid-State Circuits, vol. 47, No. 7, Jul. 2012, pp. 1636-1645.
Kirolos, S., et al., "Analog-to-Information Conversion via Random Demodulation", In IEEE Dallas/CAS Workshop on Design, Applications, Integration and Software, Richardson, TX, US, Oct. 29-30, 2006, pp. 71-74.
Kitsunezuka, M., et al., "A 30-MHz-2.4-GHz CMOS Receiver With Integrated RF Filter and Dynamic-Range-Scalable Energy Detector for Cognitive Radio Systems", In IEEE Journal of Solid-State Circuits, vol. 47, No. 5, May 2012, pp. 1084-1093.
Kitsunezuka, M., et al., "A 5-9-mW, 0.2-2.5-GHz CMOS Low-IF Receiver for Spectrum-Sensing Cognitive Radio Sensor Networks", In IEEE Radio Frequency Integrated Circuits Symposium, Honolulu, HI, US, Jun. 4-6, 2013, pp. 319-322.
Laska, J.N., et al., "Theory and Implementation of an Analog-to-Information Converter Using Random Demodulation", In IEEE International Symposium on Circuits and Systems, New Orleans, LA, US, May 27-30, 2007, pp. 1959-1962.
Le, T.N., et al., "Ultra Low-Power Asynchronous MAC Protocol using Wake-Up Radio for Energy Neutral WSN", In Proceedings of

(56) References Cited

OTHER PUBLICATIONS the 1st International Workshop on Energy Neutral Sensing Systems, Article 10, Nov. 14, 2013, pp. 1-6.
McHenry, M.A., et al., "Spectrum Occupancy Measurements", NeTs-ProWIN: Characterization and Impacton Network Performance, Shared Spectrum Company, Dec. 20, 2005, pp. 1-58.
Miar, Y., et al., "A Novel Reduced Power Compressive Sensing Technique for Wideband Cognitive Radio", In EURASIP Journal on Wireless Communications and Networking, Dec. 2012, pp. 1-12.
Mirzaei, A., et al., "Analysis and Optimization of Current-Driven Passive Mixers in Narrowband Direct-Conversion Receivers", In IEEE Journal of Solid-State Circuits, vol. 44, No. 10, Oct. 2009, pp. 2678-2688.
Mirzaei, A., et al., "A 65 nm CMOS Quad-band SAW-less Receiver SoC for GSM/GPRS/EDGE", In IEEE Journal of Solid-State Circuits, vol. 46, No. 4, Apr. 2011, pp. 950-964.
Mishali, M., et al., "Blind Multiband Signal Reconstruction: Compressed Sensing for Analog Signals", In IEEE Transactions on Signal Processing, vol. 57, No. 3, Mar. 2009, pp. 993-1009.
Mishali, M., et al., "From Theory to Practice: Sub-Nyqust Sampling of Sparse Wideband Analog Signals", In IEEE Journal of Selected Topics in Signal Processing, vol. 4, No. 2, Apr. 2010, pp. 375-391.
Mishali, M., et al., "Wideband Spectrum Sensing at Sub-Nyquist Rates", In IEEE Signal Processing Magazine, vol. 28, No. 4, Jul. 2011, pp. 102-135.
Mitola III, J., "Cognitive Radio For Flexible Mobile Mulitmedia Communications", In Mobile Networks and Applications, vol. 6, No. 5, Sep. 2001, pp. 435-441.
Murmann, B., "ADC Performance Survey 1997-2015", last updated Jul. 2016, pp. 1-4, available at: http://web.stanford.edu/~murmann/adcsurvey.html.
Murphy, D., et al., "A Blocker-Tolerant Wideband Noise-Cancelling Receiver with a 2dB Noise Figure", In IEEE International Solid-State Circuits Conference (ISSCC), San Francisco, CA, US, Feb. 19-23, 2012, pp. 74-76.
Murphy, D., et al., "A Blocker-Tolerant, Noise-Cancelling Receiver Suitable for Wideband Wireless Applications", In IEEE Journal of Solid-State Circuits, vol. 47, No. 12, Dec. 2012, pp. 2943-2963.
Notice of Allowance dated Jan. 3, 2020 in U.S. Appl. No. 15/676,610, pp. 1-40.
Notice of Allowance dated May 8, 2017 in U.S. Appl. No. 15/285,474, pp. 1-47.
Notice of Allowance dated Jul. 18, 2018 in U.S. Appl. No. 15/510,910, pp. 1-23.
Notice of Allowance dated Dec. 13, 2017 in U.S. Appl. No. 15/117,662, pp. 1-13.
Office Action dated May 11, 2018 in U.S. Appl. No. 15/676,610, pp. 1-29.
Office Action dated May 19, 2017 in U.S. Appl. No. 15/117,662, pp. 1-18.
Office Action dated Dec. 13, 2018 in U.S. Appl. No. 15/676,610, pp. 1-23.
Office Action dated Dec. 14, 2017 in U.S. Appl. No. 15/510,910, pp. 1-26.
Office Action dated Dec. 16, 2016 in U.S. Appl. No. 15/285,474, pp. 1-29.
Oller, J., et al., "Design, Development, and Performance Evaluation of a Low-Cost, Low-Power Wake-Up Radio System for Wireless Sensor Networks", In ACM Transactions on Sensor Networks (TOSN), vol. 10, No. 1, Article 11, Nov. 2013, pp. 1-24.
Pandey, J., and Otis, B.R., "A Sub-100 µW MICS/ISm Band Transmitter Based on Injection-Locking and Frequency Multiplication", In IEEE Journal of Solid-State Circuits, vol. 46, No. 5, May 2011, pp. 1049-1058.
Park, J., et al., "A Fully Integrated UHF-Band CMOS Receiver With Multi-Resolution Spectrum Sensing (MRSS) Functionality for IEEE 802.22 Cognitive Radio Applications", In IEEE Journal of Solid-State Circuits, vol. 44, No. 1, Jan. 2009, pp. 258-268.

Park, J.W. and Razavi, B., "A 20 mW GSM/WCDMA Receiver with RF Channel Selection", In Proceedings of IEEE International Solid-State Circuits Conference (ISSCC), San Francisco, CA, US, Feb. 9-14, 2014, pp. 356-358.
Pickholtz, R.L., et al., "Theory of Spread-Spectrum Communications —A Tutorial", In IEEE Transactions on Comminications, vol. 30, No. 5, May 1982, pp. 855-884.
Pletcher, N.M., "Ultra-Low Power Wake-Up Receivers for Wireless Sensor Networks", Technical Report, Department of Electrical Engineering and Computer Sciences, Univeristy of California, Berkeley, CA, US, May 20, 2008, pp. 1-164.
Pletcher, N.M., et al., "A 52µW Wake-Up Receiver with 72-dBm Sensitivity using an Uncertain-IF Architecture", In the IEEE Journal of Solid-State Circuits, vol. 44, No. 1, Jan. 2009, pp. 269-280.
Pollin, S., et al., "Digital and Analog Solution for Low-power Multi-band Sensing", In IEEE DySPAN 2010, Singapore, SG, Apr. 6-9, 2010, pp. pp. 1-2.
Polo, Y.L., et al., "Compressive Wide-Band Spectrum Sensing", In IEEE International Conference on Acoustics, Speech and Signal Processing (ICASSP), Taipei, TW, Apr. 19-24, 2009, pp. 2337-2340.
Razavi, B., "Design Considerations for Direct-Conversion Receivers", In IEEE Transactions on Circuits and Systems, vol. 44, No. 6, Jun. 1997, pp. 428-435.
Roberts, N.E. and Wentzloff, D.D., "A 98 nW Wake-Up Radio for Wireless Body Area Networks", In the IEEE Radio Frequency Integrated Circuits Symposium (RFIC '12), Montreal, Canada, Jun. 17-19, 2012, pp. 373-376.
Roberts, N.E., et al., "A 236nW-56.5dBm-Sensitivity Bluetooth Low-Energy Wakeup Receiver with Energy Harvesting in 65nm CMOS", In Proceedings of the International Solid-State Circuits Conference (ISSCC), San Francisco, CA, US, Feb. 11-15, 2016, pp. 450-451.
Salazar, C., et al., "A 2.4 GHz Interferer-Resilient Wake-Up Receiver Using a Dual-IF Multi-Stage N-Path Architecture", In the IEEE Journal of Solid-State Physics, vol. 51, No. 9, Sep. 2016, pp. 2091-2110.
Selva, J., "Regularized Sampling of Multiband Signals", In IEEE Transactions on Signal Processing, vol. 58, No. 11, Nov. 2010, pp. 5624-5638.
Sen, S., et al., "A Power-Scalable Channel-Adaptive Wireless Receiver Based on Built-In Orthogonally Tunable LNA", In Transactions on Circuits and Systems I: Regular Papers, vol. 59, No. 5, May 2012, pp. 946-957.
Soer, M.C.M., et al., "0.2-to-2.0GHz 65nm CMOS Receiver Without LNA Achieving >11dBm IIP3 and <6.5 dB NF", In IEEE International Solid-State Circuits Conference Digest of Technical Papers, Feb. 12, 2009, pp. 222-223.
Steyaert, M. and Craninckx, J., "1.1 GHz Oscillator Using Bondwire Inductance", In Electronics Letters, vol. 30, No. 3, Feb. 3, 1994, pp. 244-245.
Stoopman, M., et al., "Co-Design of a CMOS Rectifier and Small Loop Antenna for Highly Sensitive RF Energy Harvesters", In the IEEE Journal of Solid-State Circuits, vol. 49, No. 3, Mar. 2014, pp. 622-634.
Sturm, J., et al., "A 65nm CMOS Wide-band LNA with Continuously Tunable Gain from 0dB to 24dB", In Proceedings of IEEE International Symposium on Circuits and Systems (ISCAS), Beijing, CN, May 19-23, 2013, pp. 733-736.
Tian, Z. and Giannakis, G.B., "Compressed Sensing for Wideband Cognitive Radios", In IEEE International Conference on Acoustics, Speech and Signal Processing (ICASSP), Honolulu, HI, US, Article 4, Apr. 15-20, 2007, pp. 1357-1360.
Tropp, J.A., et al., "Beyond Nyquist: Efficient Sampling of Sparse Bandlimited Signals", In IEEE Transactions on Information Theory, vol. 56, Jan. 2010, pp. 520-544.
Tropp, J.A., et al., "Signal Recovery from Random Measurements via Orthogonal Matching Pursuit", In IEEE Transactions on Information Theory, vol. 53, No. 12, Dec. 2007, pp. 4655-4666.
Umbdenstock, E., et al., "Wake-Up-Receiver in Energy Efficient Wireless Sensor Networks for Security Applications", In Proceedings of the 7th Edition of the Interdisciplinary Workshop on Global Security, Jan. 22-23, 2013, pp. 1-4.

(56) References Cited

OTHER PUBLICATIONS

Viitala, O., et al., "A Wideband Under-Sampling Blocker Detector with a 0.7-2.7GHz Mixer First Receiver", In the Proceedings of the 2015 Radio Frequency Inegrated Circuits Symposium, Phoenix, AZ, US, May 2015, pp. 1-4.

Wang, Y., et al., "A Two-Step Compressed Spectrum Sensing Scheme for Wideband Cognitive Radios", In IEEE Global Telecommunications Conference (GLOBECOM), Miami, FL, US, Dec. 6-10, 2010, pp. 1-5.

Wang, Y.H., et al., "A 2.1 to 6 GHz Tunable-band LNA With Adaptive Frequency Responses by Transistor Size Scaling", In IEEE Microwave and Wireless Components Letters, vol. 20, No. 6, Jun. 2010, pp. 346-348.

Werth, T., et al., "Active Feedback Interference Cancellation in RF Receiver Front-End", In Proceedings of IEEE Radio Frequency Integrated Circuits Symposium (RFIC), Boston, MA, US, Jun. 7-9, 2009, pp. 379-382.

Werth, T., et al., "An Active Feedback Interference Cancellation Technique for Blocker Filtering in RF Receiver Front-Ends", In IEEE Journal of Solid-State Circuits, vol. 45, No. 5, May 2010, pp. 989-997.

Wohlmuth, H.D. and Kehrer, D., "A Low Power 13-GB/s $2^7$-1 Pseudo Random Bit Sequence Generator IC in 120 nm Bulk CMOS", In Proceedings of the 17th Symposium on Integrated Circuits and System Design, Pernambuco, BR, Sep. 7-11, 2004, pp. 233-236.

Yang, X., et al., "Random Circulant Orthogonal Matrix Based Analog Compressed Sensing", In IEEE Global Communications Conference (GLOBECOM), Anaheim, CA, US, Dec. 3-7, 2012, pp. 3605-3609.

Yazicigil, R.T., et al., "A 2.7-to-3.7GHz Rapid Interferer Detector Exploiting Compressed Sampling with a Quadrature Analog-to-Information Converter", In IEEE Solid-State Circuits Conference, San Francisco, CA, US, Feb. 2015, pp. 1-3.

Ye, D., et al., "An Ultra-Low-Power Receiver Using Transmitted-Reference and Shifted Limiters for In-Band Interference Resilience", In the Proceedings of the IEEE Solid-State Circuits Conference, San Francisco, CA, US, Jan.-Feb. 2016, pp. 438-439.

Yoo, J., et al., "A 100MHz-2GHz 12.5x sub-Byquist Rate Receiver in 90nm CMOS", In IEEE Radio Frequency Integrated Circuits Symposium, Montreal, Canada, Jun. 17-19, 2012, pp. 31-34.

Youssef, S., et al., "Active Feedback Receiver with Integrated Tunable RF Channel Selectivity, Distortion Cancelling, 48dB Stopband Rejection and >+12Bm Wideband IIP3, Occupying 0.06mm2 in 65nm CMOS", In Proceedings of IEEE ISSCC, San Francisco, CA, US, Feb. 19-23, 2012, pp. 166-168.

Yu, S.A. and Kinget, P., "A 0.042-mm2 Fully Integrated Analog PLL with Stacked Capacitor-Inductor in 45nm CMOS", In the Proceedings of the European Solid-State Circuits Conference, Edinburgh, UK, Sep. 2008, pp. 94-97.

Yu, Z., et al., "Mixed-Signal Parallel Compressed Sensing and Reception for Cognitive Radio", In IEEE International Conference on Acoustics, Speech and Signal Processing, Las Vegas, NV, US, Mar. 31-Apr. 4, 2008, pp. 3861-3864.

Zhang, H. and Sanchez-Sinencio, E., "Linearization Techniques for CMOS Low Noise Amplifiers: A Tutorial", In IEEE Transactions on Circuits and Systems I: Regular Papers, vol. 58, No. 1, Jan. 2011, pp. 22-36.

Zhang, T., "Sparse Recovery with Orthogonal Matching Pursuit Under Rip", In IEEE Transactions on Information Theory, vol. 57, No. 9, Sep. 2011, pp. 6215-6221.

Zhou, W., et al., "Using Capacitive Cross-coupling Technique in RF Low Noise Amplifiers and Down-conversion Mixer Design", In Proceedings of the European Solid-State Circuits Conference (ESSCIRC), Stockholm, SE, Sep. 19-21, 2000, pp. 77-80.

Bajor et al., "An 8-Element, 1-3GHz Direct Space-to-Information Converter for Rapid, Compressive-Sampling Direction-of-Arrival Finding Utilizing Pseudo-Random Antenna-Weight Modulation," in Proc. IEEE Radio Freq. Integr. Circuits Symp., Jun. 2018, pp. 116-119.

Bajor et al., "Theory and Design of a Direct Space-to-Information Converter for Rapid Detection of Interferer DoA," in Proc. IEEE 86th Veh. Technol. Conf., Sep. 2017, pp. 1-5.

Barati et al., "Directional Cell Search for Millimeter Wave Cellular Systems," in Proc. IEEE 15th Int. Workshop Signal Process. Adv. Wireless Commun., Jun. 2014, pp. 120-124.

Belfior et al., "Digital Beam Forming and Compressive Sensing Based DOA Estimation in MIMO Arrays," in Proc. 8th Eur. Radar Conf., Oct. 2011, pp. 285-288.

Brown et al., "Extreme Beam Broadening Using Phase Only Pattern Synthesis," in Proc. 4th IEEE Workshop Sensor Array Multichannel Process., Jul. 2006, pp. 36-39.

Candès, E., "Compressive Sampling," in Proc. Int. Congr., Aug. 2006, pp. 1433-1452.

Chi et al., "Sensitivity to Basis Mismatch in Compressed Sensing," in IEEE Trans. Signal Process., vol. 59, No. 5, May 2011, pp. 2182-2195.

Gerstoft et al., "Multiple Snapshot Compressive Beamforming," in Proc. 49th Asilomar Conf. Signals, Syst. Comput., Nov. 2015, pp. 1774-1778.

Ghaffari et al., "Simultaneous Spatial and Frequency-Domain Filtering at the Antenna Inputs Achieving up to +10dBm Out-of-Band/beam P1dB," in IEEE Int. Solid-State Circuits Conf. Dig. Tech. Papers, Feb. 2013, pp. 84-85.

Giordani et al., "Initial Access in 5G mmWave Cellular Networks," in IEEE Commun. Mag., vol. 54, No. 11, Nov. 2016, pp. 40-47.

Haque et al., "A Reconfigurable Architecture Using a Flexible LO Modulator to Unify High-Sensitivity Signal Reception and Compressed Sampling Wideband Signal Detection," in IEEE J. Solid-State Circuits, vol. 53, No. 6, Jun. 2018, pp. 1577-1591.

Kohno et al,. "Array Antenna Beamforming based on Estimation of Arrival Angles using DFT on Spatial Domain," in Proc. IEEE Int. Symp. Pers., Indoor Mobile Radio Commun., Sep. 1991, pp. 38-43.

Marzi et al., "Compressive Channel Estimation and Tracking for Large Arrays in mm-Wave Picocells," in IEEE J. Sel. Topics Signal Process., vol. 10, No. 3, Apr. 2016, pp. 514-527.

Office Action dated Oct. 6, 2021 in U.S. Appl. No. 16/420,108, pp. 2-5.

Rasekh et al., "Effect of Out-of-Band Blockers on the Required Linearity, Phase Noise, and Harmonic Rejection of SDR Receivers without Input SAW Filter," in IEEE Trans. Microw. Theory Techn., vol. 66, No. 11, Nov. 2018, pp. 4913-4926.

Rossi et al., "Spatial Compressive Sensing for MIMO Radar," in IEEE Trans. Signal Process., vol. 62, No. 2, Jan. 2014, pp. 419-430.

Roy et al., "Estimation of Signal Parameters via Rotational Invariance Techniques—ESPRIT," in Proc. IEEE Mil. Commun. Conf., Commun.-Comput., Teamed, vol. 3, Oct. 1986, pp. 41.6.1-41.6.5.

S. Hur et al., "Multilevel Millimeter Wave Beamforming for Wireless Backhaul," in Proc. IEEE Globecom Workshops, Dec. 2011, pp. 253-257.

Schmidt et al., "Multiple Emitter Location and Signal Parameter Estimation," in IEEE Trans. Antennas Propag., vol. AP-34, No. 3, Mar. 1986, pp. 276-280.

Shaw et al., "Angle of Arrival Detection Using Compressive Sensing," in Proc. 18th Eur. Signal Process. Conf., Aug. 2010, pp. 1424-1428.

Soer et al., "Beamformer with Constant-Gm Vector Modulators and its Spatial Intermodulation Distortion," in IEEE J. Solid-State Circuits, vol. 52, No. 3, Mar. 2017, pp. 735-746.

Soer et al., "Spatial Interferer Rejection in a Four-Element Beamforming Receiver Front-End with a Switched-Capacitor Vector Modulator," in IEEE J. Solid-State Circuits, vol. 46, No. 12, Dec. 2011, pp. 2933-2942.

Van Veen et al., "Beamforming: A Versatile Approach to Spatial Filtering," in IEEE ASSP Mag., vol. 5, No. 2, Apr. 1988, pp. 4-24.

Wang et al., "Direction Estimation Using Compressive Sampling Array Processing," in Proc. IEEE/SP 15th Workshop Statist. Signal Process., Aug.-Sep. 2009, pp. 626-629.

Xenaki et al., "Sparse DOA Estimation with Polynomial Rooting," in Proc. 3rd Int. Workshop Compressed Sensing Theory Appl. Radar, Sonar Remote Sensing, Jun. 2015, pp. 104-108.

Yazicigil et al., "How to Make Analog-to-Information Converters Work in Dynamic Spectrum Environments with Changing Sparsity

(56) References Cited

OTHER PUBLICATIONS

Conditions," in IEEE Trans. Circuits Syst. I, Reg. Papers, vol. 65, No. 6, Jun. 2018, pp. 1775-1784.
Yazicigil et al., "Wideband Rapid Interferer Detector Exploiting Compressed Sampling with a Quadrature Analog-to-Information Converter," in IEEE J. Solid-State Circuits, vol. 50, No. 12, Dec. 2015, pp. 3047-3064.
Zhang et al., "A0.1-to-3.1GHz4-Element MIMO Receiver Array Supporting Analog/RF Arbitrary Spatial Filtering," in ISSCC, Feb. 2017, pp. 410-411.
Zhang et al., "9.2 A Scalable 0.1-to-1.7GHz Spatio-Spectral-Filtering 4-Element MIMO Receiver Array With Spatial Notch Suppression Enabling Digital Beamforming," in IEEE Int. Solid-State Circuits Conf. Tech. Dig. Papers, Jan./Feb. 2016, pp. 166-167.
Zhang et al., "Arbitrary Analog/RF Spatial Filtering for Digital MIMO Receiver Arrays," IEEE J. Solid-State Circuits, vol. 52, No. 12, Dec. 2017, pp. 3392-3404.

* cited by examiner

| Mode | LOSEL | EN1 | EN2 | SELab1 | ENa1 | ENb1 | SELab2 | ENa2 | ENb2 | Modulation Waveform | CS LO | CG LO |
|---|---|---|---|---|---|---|---|---|---|---|---|---|
| Mode 1 | 0 | 0 | 0 | x | 0 | 0 | x | 0 | 0 | - | $\exp(jw_{LO}t)$ | |
| Mode 2 | 0 | 1 | 0 | 0 | 0 | 1 | x | 0 | 0 | Tone | $\cos(w_M t)\exp(jw_{LO}t)$ | |
| Mode 3a | 1 | 1 | 1 | 1 | 1 | 0 | 1 | 1 | 0 | PRBS | $\exp(jw_{LO}t)$ | |
| Mode 3b | 1 | 1 | 1 | 1 | 1 | 0 | 1 | 1 | 0 | PRBS | | $\exp(jw_{LO}t)$ |

FIG. 7

CIRCUITS FOR IDENTIFYING INTERFERERS USING COMPRESSED-SAMPLING

CROSS-REFERENCE TO RELATED APPLICATION

This application claims the benefit of U.S. Provisional Patent Application No. 62/411,626, filed Oct. 23, 2016, which is hereby incorporated by reference herein in its entirety.

STATEMENT REGARDING GOVERNMENT-FUNDED RESEARCH

This invention was made with government support under 1343282 awarded by the National Science Foundation. The government has certain rights in the invention.

BACKGROUND

It is expected that soon billions of new devices ranging from personal health monitoring devices to smart cars and unmanned aerial vehicles will compete with mobile phones for access to an increasingly congested electromagnetic spectrum. The current paradigm of pre-allocating spectrum for use by designated classes of devices may no longer be sufficient to guarantee access to all.

To address this problem, cognitive radio (CR) based dynamic shared spectrum access (DSSA) systems may be used to replace or supplement static-in-time-and-frequency radio links with multiple short-time-span, dynamic-in-frequency links. Such CR based DSSA systems are expected to be capable of rapidly gaining awareness of their fast changing spectrum environment and opportunistically accessing a shared pool of spectrum spanning a range of frequencies (e.g., 600 MHz to 6 GHz).

Spectrum sensing is a key component of CR based DSSA systems. Spectrum sensing can be used to sense weak incumbents (which are referred to herein as interferers) and finding gaps in a crowded spectrum.

Turning to FIG. 1, an illustration of signals that a cognitive radio (CR) based dynamic shared spectrum access (DSSA) system may attempt to detect is provided. As shown, consider a real-valued sparse lowpass signal x(t) where the Fourier transform X(f) of the signal x(t) vanishes outside of some known frequency range $F=(0; f_{MAX}]$. Assume that F is partitioned into N bins, where $N=f_{MAX}/B$ and each bin is of width B Hz. Up to K of these bins, where $K \ll N$, are occupied by components of X(f) with bandwidth of at most B Hz and with power that exceeds a predefined level. Further assume that of the N total bins in F, $N_0$ bins are contained in $F_0=[f_{MIN}; f_{MAX}]$, $\bar{N}_0$ bins are contained in $\bar{F}_0=(0; f_{MIN})$, and $N=N_0+\bar{N}_0$. For this example, a sparse bandpass signal is defined such that its Fourier transform vanishes outside of the known frequency range $F_0=[f_{MIN}; f_{MAX}]$. The frequency components of this sparse bandpass signal that exceed a predefined level are assumed to occupy only $K_0$ bins in $F_0$, where $K_0 \ll N_0$. As also shown, in FIG. 1, $\bar{K}_0$ bins are occupied in $\bar{F}_0$. $K=K_0+\bar{K}_0$.

One approach to performing spectrum sensing to identify interferers is compressed-sampling (CS). CS architectures have the potential to enable energy-efficient, rapid, wideband signal detection.

SUMMARY

Circuits for identifying interferers using compressed-sampling are provided in accordance with some embodiments. In some embodiments, a circuit for identifying interferers using compressed-sampling includes a low noise amplifier (LNA), a passive mixer, a local oscillator (LO), a low pass filter, an analog-to-digital converter (ADC), a digital baseband (DBB) circuit, and a compression-sampling digital signal processor (DSP). The LNA has an input that receives a radio frequency (RF) signal. The passive mixer has a first input coupled to an output of the LNA. The LO source has an output coupled to a second input of the passive mixer. The low pass filter has an input coupled to an output of the passive mixer. The ADC has an input coupled to an output of the low pass filter. The digital baseband (DBB) circuit has an input coupled to an output of the ADC. The compression-sampling digital signal processor (DSP) has an input coupled to an output of the DBB circuit. The compression-sampling DSP is configured to output identifiers of frequency locations of interferers. In a first mode, the LO source outputs a modulated LO signal that is formed by modulating a local oscillator signal with a pseudo-random sequence.

BRIEF DESCRIPTION OF THE DRAWINGS

FIG. 7 is an example of a table showing settings of control signals in the schematic of FIG. 6 for different modes of the receiver of FIG. 6 in accordance with some embodiments.

DETAILED DESCRIPTION

In accordance with some embodiments, circuits for identifying interferers using compressed-sampling are provided in accordance with some embodiments.

Figure 1:
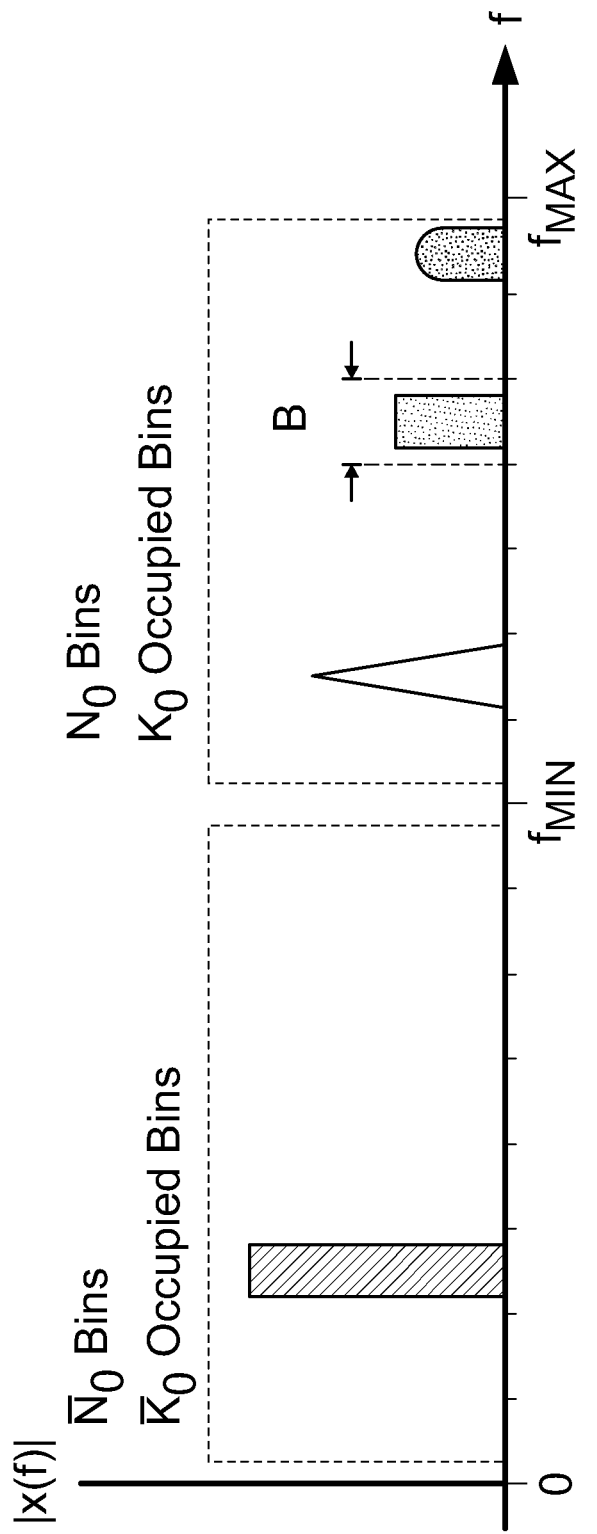
FIG. 1 is an example of an illustration showing interferers in bins of a range of frequencies in a spectrum of interest in accordance with some embodiments.
Figure 2:
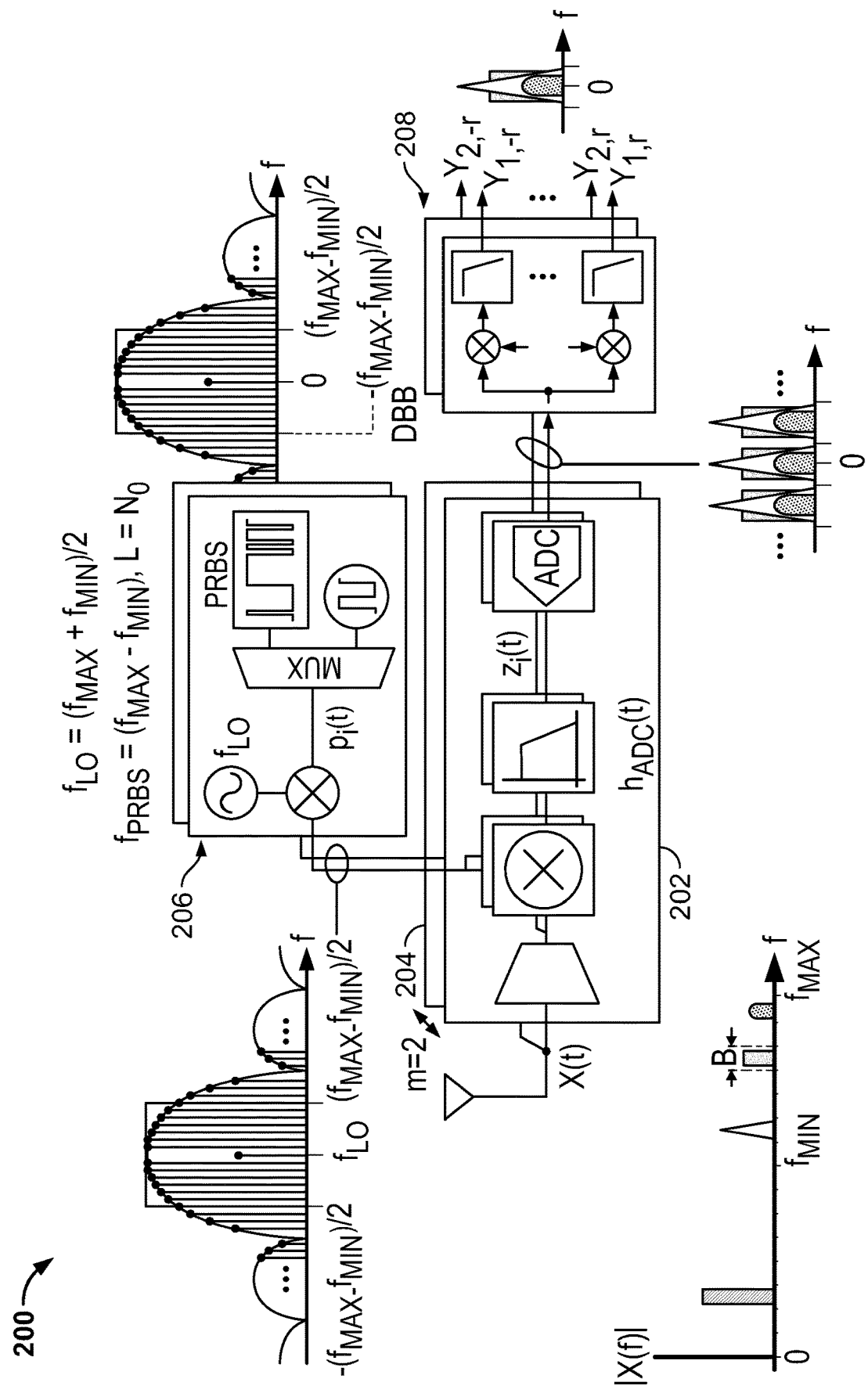
FIG. 2 is an example of an architecture for identifying interferers using compressed sampling in accordance with some embodiments.

Turning to FIG. 2, an example 200 of an architecture for performing compressed-sampling sampling in accordance with some embodiments is shown. As illustrated, architecture 200 includes a Frequency Translational Noise Cancelling (FTNC) receiver with two direct-conversion IQ branch pairs 202 and 204, a flexible local oscillator (LO) generator 206, and digital baseband (DBB) circuitry 208.

Figure 3:
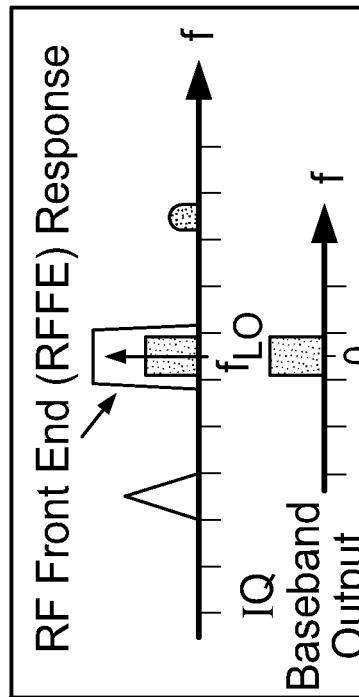
FIG. 3 is an example of a table showing three modes of operation of the architecture of FIG. 2 in accordance with some embodiments.

As shown in FIG. 3, architecture 200 is capable of three modes (1, 2, and 3) of operation.

In mode 1 (as shown in the top row of the table of FIG. 3), the architecture is configured for narrowband signal reception by disabling LO modulation and using a standard quadrature LO at $f_{LO}$ (as illustrated in the top row, middle column of the table in FIG. 3). As a result, a single narrowband RF conversion gain response is generated around $f_{LO}$ (as illustrated in the top row, right column of the table in FIG. 3).

In mode 2 (as shown in the middle row of the table of FIG. 3), the architecture is configured for narrowband sensing in two non-contiguous channels by using an LO at $f_{LO}$ that is modulated with a square wave at $f_M$. The resulting LO now includes two tones at $(f_{LO}-f_M)$ and $(f_{LO}+f_M)$ (as illustrated in the middle row, middle column of the table in FIG. 3). This then generates two narrowband RF responses around the two LO tones enabling simultaneous sensing of two non-contiguous channels (as illustrated in the middle row, right column of the table in FIG. 3).

Although FIG. 3 illustrates an embodiment in which narrowband sensing in two non-contiguous channels is performed, in some embodiments, narrowband sensing can be performed in any suitable number of non-contiguous channels. In order to do so, any suitable number of tones can be used. For example, an LO at $f_{LO}$ can be modulated with multiple square waves at $f_{M1}$, $f_{M2}$, and $f_{M3}$. The resulting LO now includes tones at $(f_{LO}-f_{M1})$, $(f_{LO}-f_{M2})$, $(f_{LO}-f_{M3})$, $(f_{LO}+f_{M1})$, $(f_{LO}+f_{M2})$, and $(f_{LO}+f_{M3})$. This then generates six narrowband RF responses around the six LO tones enabling simultaneous sensing of six non-contiguous channels.

In mode 3 (as shown in the bottom row of the table of FIG. 3), the architecture is configured for compressed-sampling wideband signal detection by using an LO at $f_{LO}$ that is modulated with a pseudo-random bit sequence (PRBS) of length $N_0$ and clock frequency $f_{PRBS}$ thereby upconverting the Fourier line spectra of the PRBS centered at DC (0 Hz) to $f_{LO}$. The Fourier line spectra of a suitably chosen PRBS (e.g., an m-sequence, a low-density parity check (LDPC) sequence, a Gold sequence, a Rademacher sequence, a quantized Gaussian sequence, or any other suitable PRBS, any of which can be two level, three level, or any suitable number of levels) has a wide $\sin(x)/x$ envelope where the 3 dB width of the main lobe is equal to its clock frequency $f_{PRBS}$. The resulting LO spectrum thus includes a series of tones centered at $f_{LO}$ and spaced by the desired resolution bandwidth $B=f_{PRBS}/N_0$ (as illustrated in the bottom row, middle column of the table in FIG. 3). This PRBS modulated LO is then used to drive the passive mixers in the FTNC thereby up-converting the baseband lowpass filter response to multiple RF frequencies separated by B to create a very wide bandpass RF response with a 3 dB bandwidth extending from $f_{MIN}=(f_{LO}-f_{PRBS}/2)$ to $f_{MAX}=(f_{LO}+f_{PRBS}/2)$ (as illustrated in the bottom row, right column of the table in FIG. 3).

Figure 4:
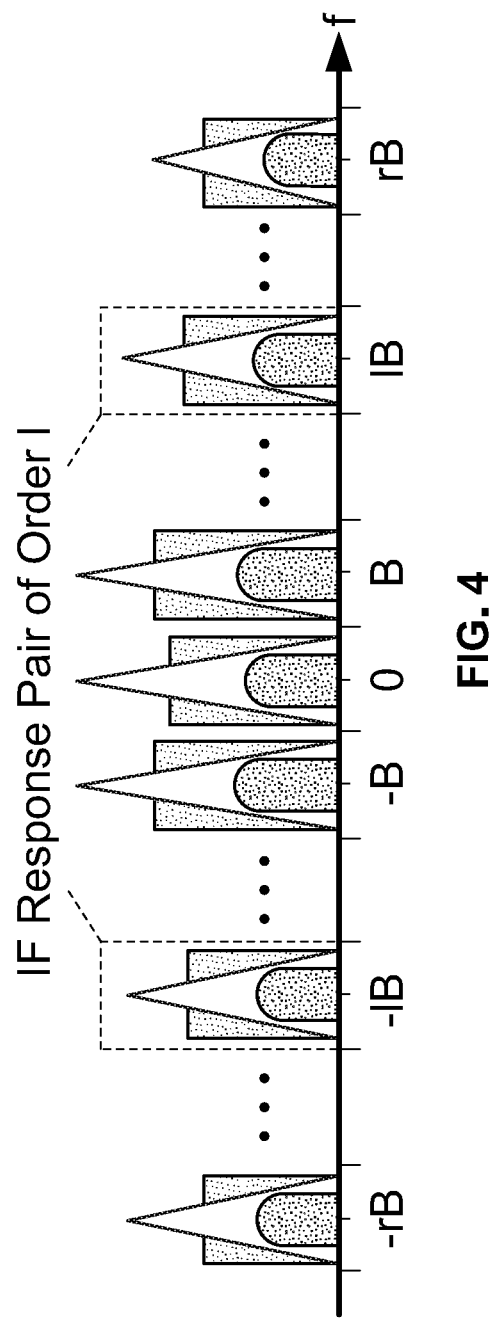
FIG. 4 is an example of an illustration showing identification of interferers using compressed sampling over a range of frequencies in accordance with some embodiments.

Referring back to FIG. 2, which shows the architecture operating in mode 3, the IQ analog output pairs $z_i(t)$, where $z_i(t)=x(t)\{e^{j w_c t} p_i(t)\} * h_{ADC}(t)$, in branch pairs 202 and 204 contain all $N_0$ bins of width B from $F_0=[f_{Min}; f_{MAX}]$. These bins are folded into $(2r+1)$, where $r=0, 1, 2, \ldots$, complex intermediate frequency (IF) frequencies separated by B as illustrated in FIG. 4. Each of the m, where m=2 (because there are two direct-conversion IQ branch pairs 202 and 204), IQ analog outputs are multiplied with 2r orthogonal complex exponentials of frequencies that are integer multiples of B in digital baseband (DBB) circuitry 208 to extract 2r higher order IF responses in addition to the response at DC (0 Hz). The total number of measurements $Y_i$ thus produced is $R=m(2r+1)$ where the following condition is satisfied: $R \geq [C_O K \log(N_0/K_0)]$.

Figure 5A:
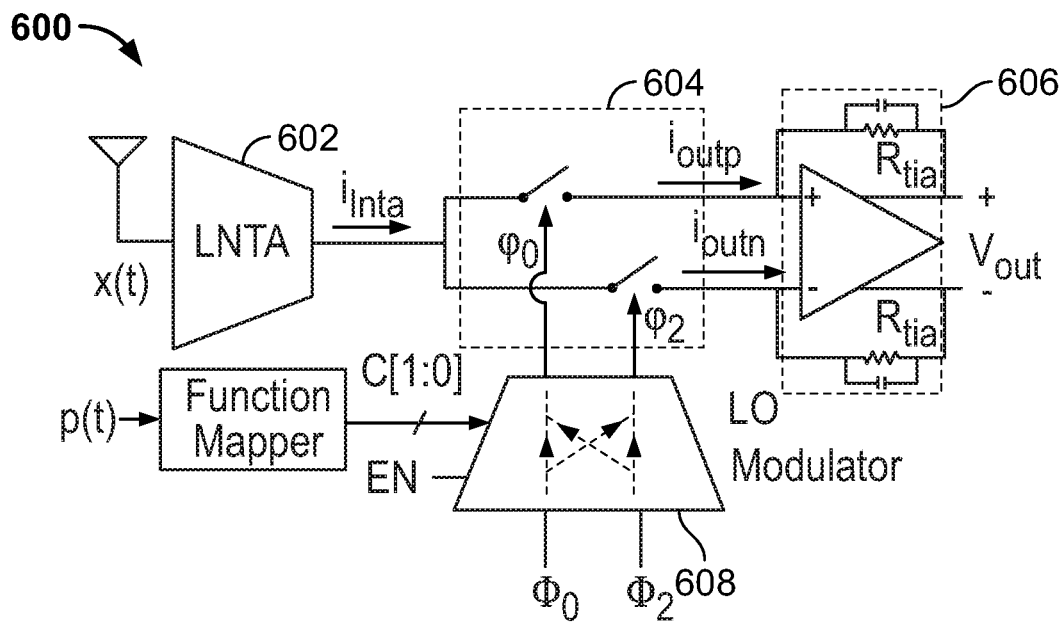
FIG. 5A is an example of an illustration describing the operation of an in-phase branch of the architecture of FIG. 2 in accordance with some embodiments.

Turning to FIG. 5A, consider an in-phase (I) branch of the architecture of FIG. 2 including a low-noise transconductance amplifier (LNTA) 602, a passive mixer 604, and a trans-impedance amplifier (TIA) 606. The RF output current $i_{lnta}$ of LNTA 602 is down-converted by passive mixer 604 (formed using two switches (e.g., two MOSFETs or any other suitable switches)) that are driven by two non-overlapping clocks $\varphi_0$ and $\varphi_2$ from a local oscillator (LO) modulator 608. Assuming ideal switches in passive mixer 604, the mixer output currents $i_{outp}$ and $i_{outn}$ are equal to $i_{lnta}$ multiplied by the associated clock pulses $\varphi_0$ and $\varphi_2$ which can be modeled as piecewise constant functions alternating between 0 and 1. The TIA differential output voltage is $V_{out}=x(t)G_m(\varphi_0-\varphi_2)(R_{tia}//C)=x(t)G_m(R_{tia}//C)\Sigma_{n=-\infty}^{\infty}(\alpha_{0,n}-\alpha_{2,n})e^{j2\pi n f_{LO} t}$ where $\alpha_{0,n}$ and $\alpha_{2,n}$ are the Fourier coefficients and $f_{LO}$ is the frequency of the clock pulses $\varphi_0$ and $\varphi_2$.

When LO modulator 608 is disabled (EN=0), the LO modulator passes the standard in-phase 25% duty cycle input LO pair $(\Phi_0, \Phi_2)$ to its output $(\varphi_0, \varphi_2)$. When LO modulator 608 is enabled (EN=1), the LO modulator operation is described by:

$$(\phi_0, \phi_2) = \begin{cases} (\Phi_0, \Phi_2) & \text{when } C[1:0] = (1,0) \\ (\Phi_2, \Phi_0) & \text{when } C[1:0] = (0,1) \\ (0, 0) & \text{when } C[1:0] = (1,1) \end{cases}$$

where the control signal pair C[1:0] is used to define the transfer function of the LO modulator. The LO modulator either maintains or flips the polarity of its differential output pair $(\varphi_0, \varphi_2)$ relative to its input $(\Phi_0, \Phi_2)$ when its control signals C[1], C[0] are complements of each other. When C[1]=C[0]=1, both outputs of the LO modulator are held at logic level 0. The control signals are controlled so that they do not have the values C[1]=C[0]=0. The Fourier coefficients of the TIA differential output voltage $V_{out}$ are:

$$\alpha_n = \begin{cases} (\beta_{0,n} - \beta_{2,n}) & \text{when } C[1:0] = (1,0) \\ (\beta_{2,n} - \beta_{0,n}) & \text{when } C[1:0] = (0,1) \\ 0 & \text{when } C[1:0] = (1,1) \end{cases}$$

where $\alpha_n=(\alpha_{0,n}-\alpha_{2,n})$. Noting that the Fourier coefficients of the clock pulses $\Phi_0$ and $\Phi_2$ are $$\beta_{0,n} = \frac{1}{4}\frac{\sin(n\pi/4)}{(n\pi/4)}e^{-jn\pi/4} \text{ and } \beta_{2,n} = \beta_{0,n}e^{-jn\pi},$$

are the Fourier coefficients of the TIA differential output voltage $V_{out}$ may now be expressed as:

$$\alpha_n = \begin{cases} \frac{1}{4}(1-e^{-jn\pi})\frac{\sin(n\pi/4)}{(n\pi/4)}e^{-jn\pi/4} & \text{when } C[1:0]=(1,0) \\ \frac{1}{4}(e^{-jn\pi}-1)\frac{\sin(n\pi/4)}{(n\pi/4)}e^{-jn\pi/4} & \text{when } C[1:0]=(0,1) \\ 0 & \text{when } C[1:0]=(1,1) \end{cases}$$

where only the odd coefficients of $\alpha_n$ are non-zero when C[0] and C[1] are complements of each other. Since the TIA has a lowpass response, only the low-frequency components of the mixer output are of interest. Setting n=−1;1 and the input signal x(t) =cos [($\omega_{LO}+\Delta\omega$) t] with $\Delta\omega<<\omega_{LO}$, the TIA output voltage is:

$$V_{out} = \begin{cases} K\cos(\Delta\omega t + \frac{\pi}{4}) & \text{when } C[1:0]=(1,0) \\ -K\cos(\Delta\omega t + \frac{\pi}{4}) & \text{when } C[1:0]=(0,1) \\ 0 & \text{when } C[1:0]=(1,1) \end{cases}$$

where $K=\sqrt{2}G_m R_{tia}/\pi$. When the LO modulator is enabled and a piecewise constant function p(t) with three discrete values {1, −1, 0} is mapped to the control signal pair C[1:0] using:

$$C[1:0] = \begin{cases} (1,0) & \text{when } p(t)=1 \\ (0,1) & \text{when } p(t)=-1 \\ (1,1) & \text{when } p(t)=0 \end{cases}$$

the output of the architecture of FIG. 5A may be described compactly as $V_{out}=\tilde{K}\{p(t)\ \cos(\omega_{LO}t)\}x(t)$ where $\tilde{K}2\sqrt{2}G_m R_{tia}//\pi$. The architecture of FIG. 5A can therefore simultaneously down-convert and multiply an input signal x(t) with p(t) where p(t) is a two or three level piecewise constant function.

Figure 5B:
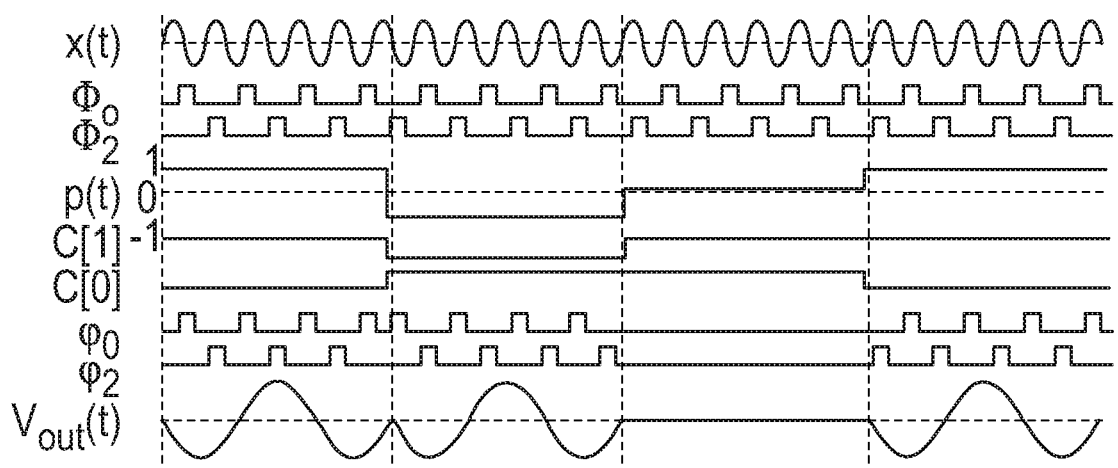
FIG. 5B is an example of a timing diagram of the operation of an in-phase branch of the architecture of FIG. 2 in accordance with some embodiments.

A timing diagram of different combinations x(t), $\Phi_0$, $\Phi_2$, p(t), C[1], C[0], $\varphi_0$, $\varphi_2$, and $V_{out}(t)$ is shown in FIG. 5B.

Figure 6:
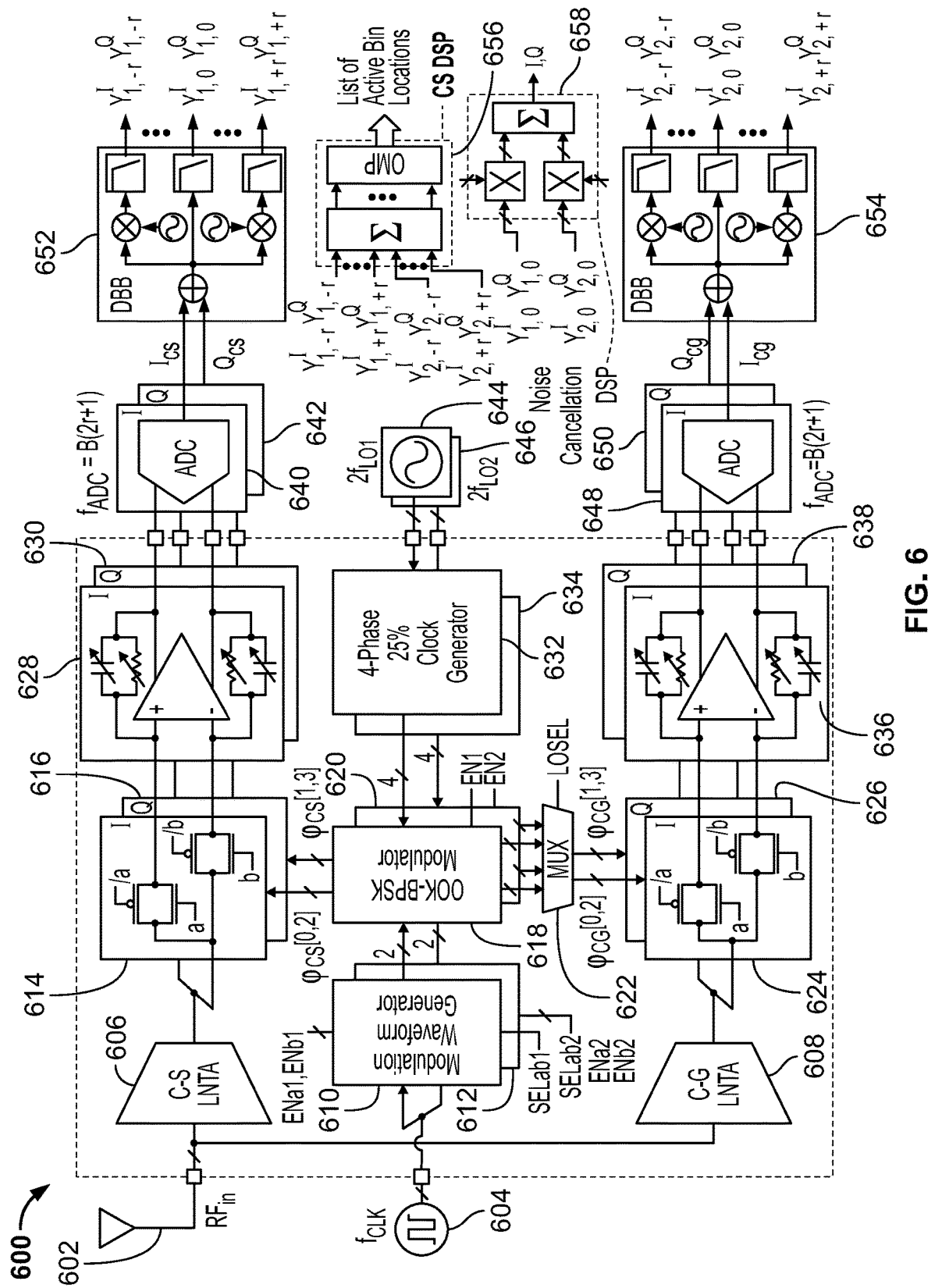
FIG. 6 is an example of a schematic of a receiver incorporating the architecture of FIG. 2 in accordance with some embodiments.

Turning to FIG. 6, a schematic of an example 600 of a receiver in accordance with some embodiments is shown. This receiver can act as a direct RF-to-information converter that unifies signal reception, narrowband spectrum sensing, and compressed-sampling wideband signal detection in some embodiments.

As illustrated in FIG. 6, receiver 600 includes an antenna 602, a clock source 604, a common-source (C-S) low-noise transconductance amplifier (LNTA) 606, a common-gate (C-G) low-noise transconductance amplifier (LNTA) 608, modulation waveform generators 610 and 612, passive mixers 614, 616, 624, and 626, on-off keying (OOK), binary phase-shifted keying (BPSK) modulators 618 and 620, a multiplexer (MUX) 622, trans-impedance amplifiers (TIAs) 628, 630, 636, and 638, four-phase, 25% clock generators 632 and 634, analog-to-digital converters (ADCs) 640, 642, 648, and 650, local oscillators (LOs) 644 and 646, digital baseband (DBB) circuits 652 and 654, compressed-sampling (CS) digital signal processor (DSP) 656, and noise cancellation digital signal processor (DSP) 658.

In mode 1, the receiver of FIG. 6 employs the RF front end (RFFE) common-source (C-S) LNTA path (formed by C-S LNTA 606, passive mixers 614 and 616, and TIAs 628 and 630) and the RFFE common-gate (C-G) LNTA path (formed by C-G LNTA 608, passive mixers 624 and 626, and TIAs 636 and 638) with noise cancellation DSP 658 to form a frequency translational noise cancellation (FTNC) receiver. Both the C-S path mixers and the C-G path mixers are driven with the same 25% duty-cycle, 4-phase LOs (from generator 632) by setting LOSEL (controlling MUX 622) to 0 and disabling modulators 618 and 620 by setting EN1 and EN2 to 0 as shown in the table of FIG. 7. ($\varphi_{CS}[0,2]$ and $\varphi_{CS}[1,3]$ are output by modulator 618; when EN1 is 0, $\varphi_{CS}[0,2]$ and $\varphi_{CS}[1,3]$ are equal to the outputs of generator 632; and when LOSEL is 0, $\varphi_{CG}[0,2]$ and $\varphi_{CG}[1,3]$ output by MUX 622 are equal to $\varphi_{CS}[0,2]$ and $\varphi_{CS}[1,3]$.) When receiving a single channel, only the middle branches $Y_{1,0}^I$, $Y_{1,0}^Q$ and $Y_{2,0}^I$, $Y_{2,0}^Q$ of DBB circuits 652 and 654 are used. In some embodiments, multiple adjacent channels may be received by increasing the TIA bandwidth, ADC sampling rate, and enabling vector modulators in the DBB.

In mode 2, only LO modulator 618 is enabled (EN1=1, EN2=0) and modulation waveform generator 610 is set to generate a square-wave (SELab1=0, ENa1=0, ENb1=1). By setting LOSEL equal to 0, both C-S path mixers 614 and 616 and C-G path mixers 624 and 626 are driven with the same square-wave modulated LO from modulator 618 to implement simultaneous narrowband sensing of two non-contiguous channels with noise cancellation.

In CS detection mode 3, both LO modulators 618 and 620 are enabled (EN1=1, EN2=1) and waveform generators 610 and 612 are configured to generate independent PRBSs by setting [SELab1,ENa1,ENb1]=[1,1,0] and [SELab2,ENa2, ENb2]=[1,1,0]. By setting LOSEL equal to 1, C-S path mixers 614 and 616 and C-G path mixers 624 and 626 are driven with two independent sets of LOs (one set from LO 644 through generator 632 then through modulator 618 to mixers 614 and 616; and another set from LO 646 through generator 634 then through modulator 620 to mixers 624 and 626 via MUX 622) modulated with two distinct PRBSs (from generators 610 and 612). Using CS DSP 656, the receiver performs wideband signal detection in a single band (mode 3a) by setting $f_{LO1}=f_{LO2}$ or in two disjoint bands (mode 3b) using distinct LOs where $f_{LO1} \neq f_{LO2}$.

Figure 8:
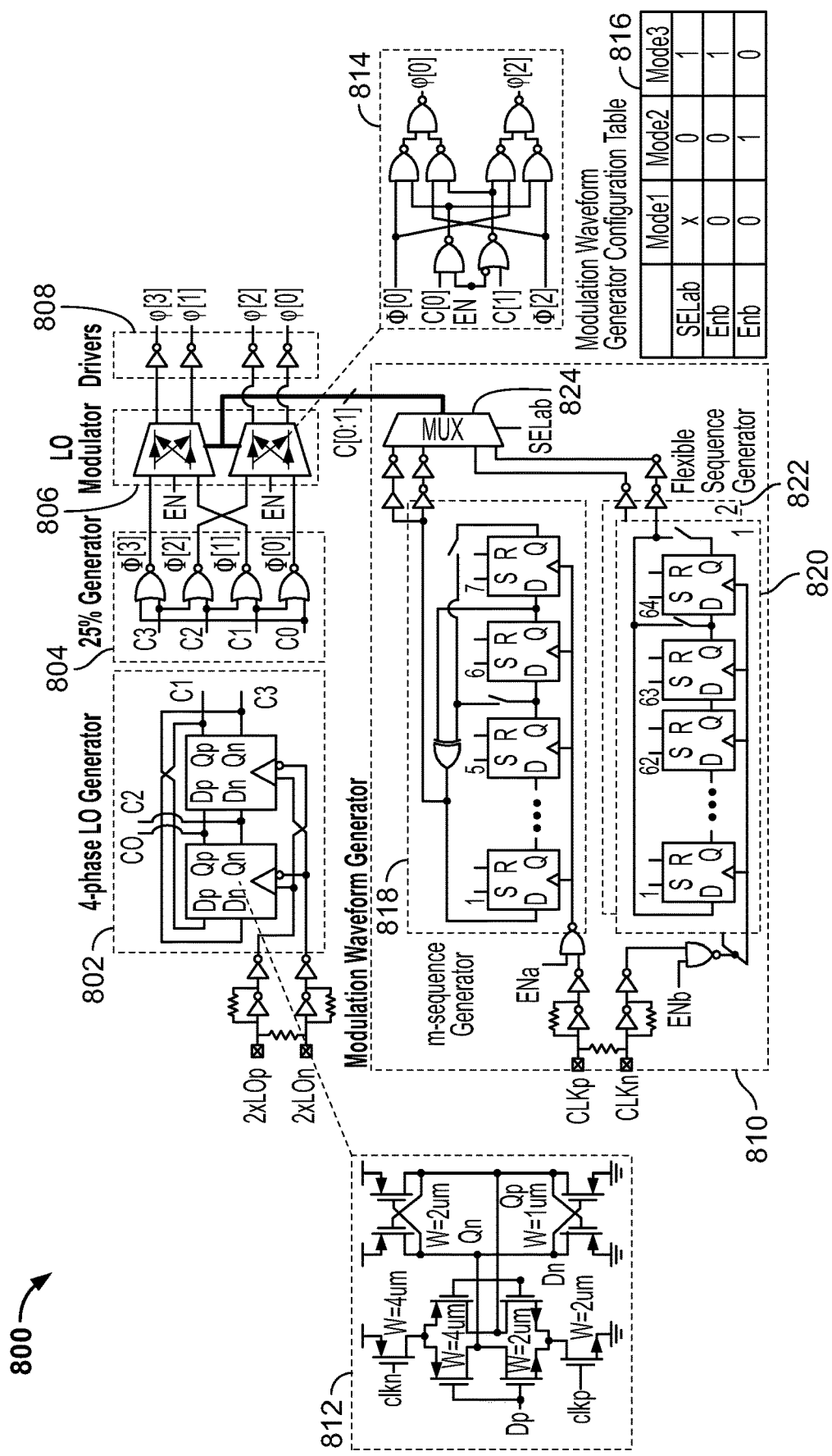
FIG. 8 is an example of a schematic of a four-phase local oscillator (LO) generator, a 25% generator, an LO modulator, drivers, and a modulation waveform generator that can be used in the receiver of FIG. 6, along with a table of control signal settings, in accordance with some embodiments.

Turning to FIG. 8, an example 800 of circuitry that can be used to implement (i) a combination of generator 610, modulator 618, and generator 632 or (ii) a combination of generator 612, modulator 620, and generator 634 is shown in accordance with some embodiments.

As illustrated in FIG. 8, circuitry 800 includes a 25% duty cycle 4-phase LO generator (formed by 4-phase LO generator 802 and 25% generator 804), an OOK-BPSK LO modulator 806, drivers 808, and a modulation waveform generator 810. The modulation waveform generator includes two function generators: (i) a maximal-length pseudo-random sequence (m-sequence) generator 818 and (ii) a user definable flexible sequence generator formed from a pair of series connected, programmable length flip-flop arrays 820 and 822, each with feedback.

User-defined sequences can be loaded into the two independent flip-flop arrays through a serial programming interface (SPI). The two flip-flop arrays can be loaded with independent logic sequences in order to represent a three level (+1,0,−1) sequence. A two-level (+/−1) sequence can be formed by loading the true and complemented versions of a logic sequence into the two flip-flop arrays. Although the figure illustrates how to implement two and three level sequences, any suitable number of levels of sequences can be implemented by employing multi-bit digital waveform synthesizers and digital-to-analog converters.

The m-sequence generator employs a linear feedback shift register (LF SR) architecture. Its length may be set to 63 or 127.

The mode settings (i.e., mode 1, mode 2, or mode 3) for generator 810 for different values on SELab, ENa, and ENb are shown in table 816.

The 2-bit output (C[1:0]) of modulation waveform generator 810 controls the functionality of LO modulator 806, and either the m-sequence or the flexible sequence can be passed to its output through a multiplexer 824.

Figure 9:
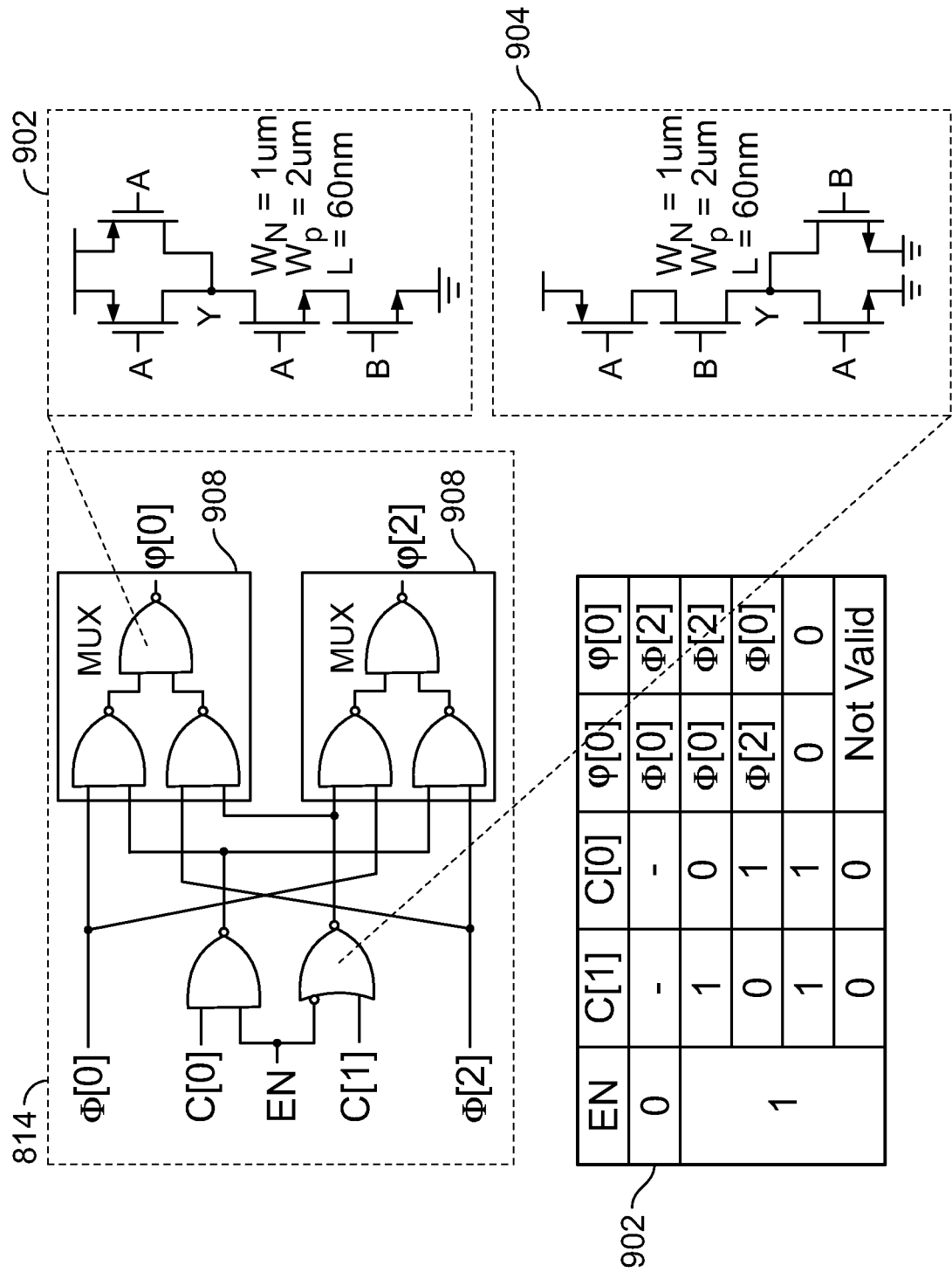
FIG. 9 is an example of a schematic showing further details of the local oscillator (LO) modulator of FIG. 8, along with a truth table for inputs to the LO modulator, in accordance with some embodiments.

LO modulator 806 includes two modulator cores that can each be represented by core 814. As shown in FIG. 9, each modulator core 814 can be implemented using: NAND gates 902 (three of which can be used to form multiplexers (MUXs) 908); and a NOR gate (with an inverted input) 904. As shown in truth table 906, the modulator cores have three valid output states. When EN=0, the cores pass the input LO signal to their outputs unaltered. When EN=1 and C[1:0]=(1,0), the cores pass the input LO signal to their outputs unaltered. When, EN=1 and C[1:0]=(0,1), the cores flip the polarity of their output pairs relative to their inputs. When EN=1 and C[1]=C[0]=1, both outputs of the cores are set to 0.

Figure 10:
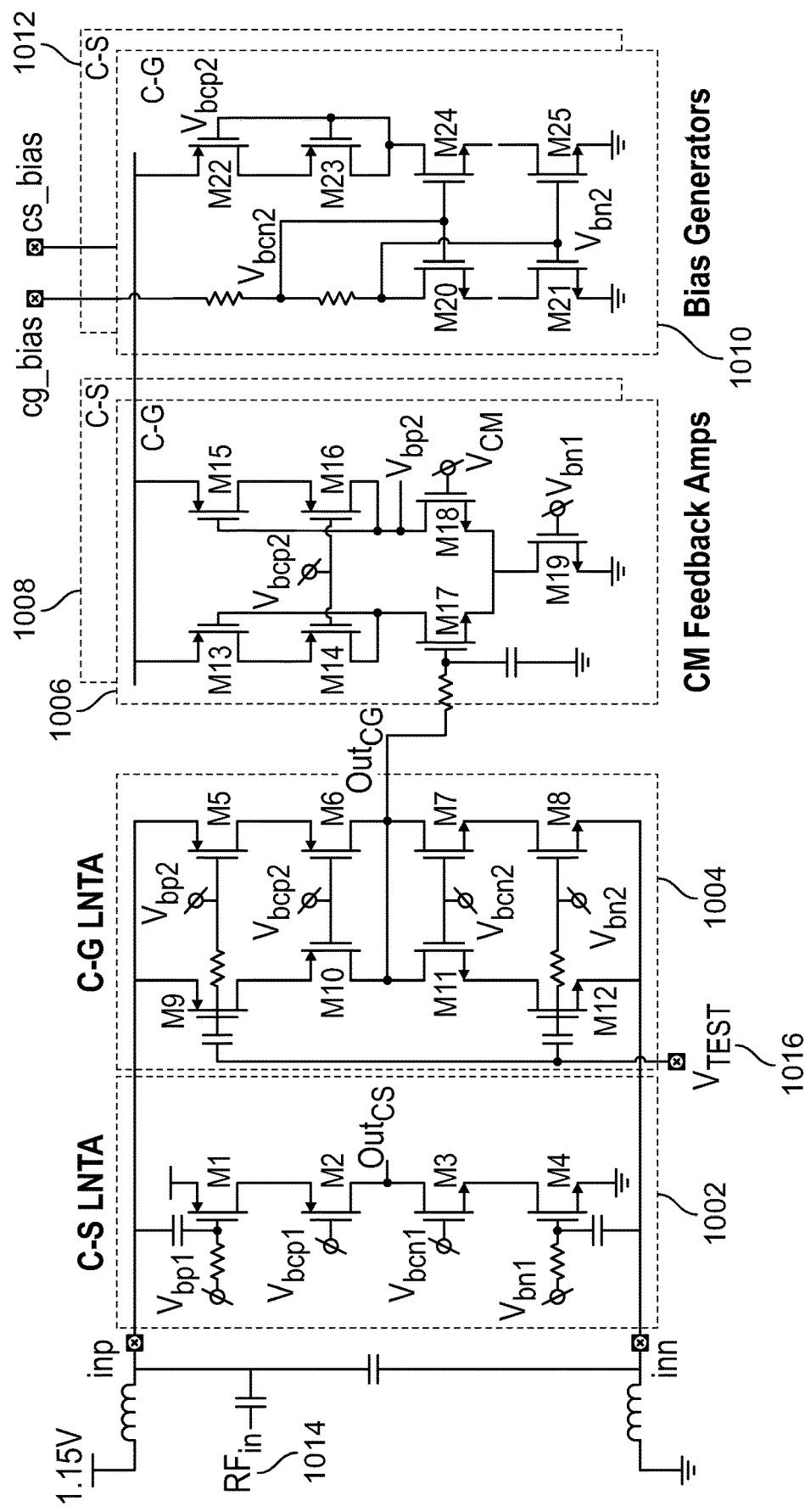
FIG. 10 is an example of a schematic of a common-source (C-S) low noise transconductance amplifier (LNTA), a common-gate (C-G) LNTA, common-mode feedback amplifiers, and bias generators that can be used in the receiver of FIG. 6 in accordance with some embodiments.

Turning to FIG. 10, examples of LNTA circuits 1002 and 1004 that can be used to implement C-S LNTA 606 and C-G LNTA 608, respectively, in accordance with some embodiments, are shown. Also shown are common-mode (CM) feedback amplifiers 1006 and 1008 and bias generators 1010 and 1012 that can be used in some embodiments. The cascoded inverter is used as the core circuit block in each LNTA circuit 1002 and 1004 and the bias current of each core may be set externally using the cs_bias and cg_bias inputs to bias generators 1010 and 1020, in some embodiments.

In noise cancelling narrowband reception mode (mode 1), a portion of the C-G LNTA core, transistors M9 through M12, can be used for calibration. During calibration, the input (RFin) 1014 can be 50 Ohm terminated and a CW test signal can be applied to the test input pin $V_{TEST}$ 1016. This test signal couples into the C-S LNTA path and stimulates a signal in the C-S path IQ output. A complex sum of the C-S and C-G IQ outputs is formed by noise cancellation DSP 658 and the gain of the two paths are adjusted by adjusting weights that are input to DSP 658 to minimize this sum thereby achieving noise cancellation. Once calibration is completed, the test input $V_{TEST}$ 1016 can be grounded through a capacitor.

Figure 11:
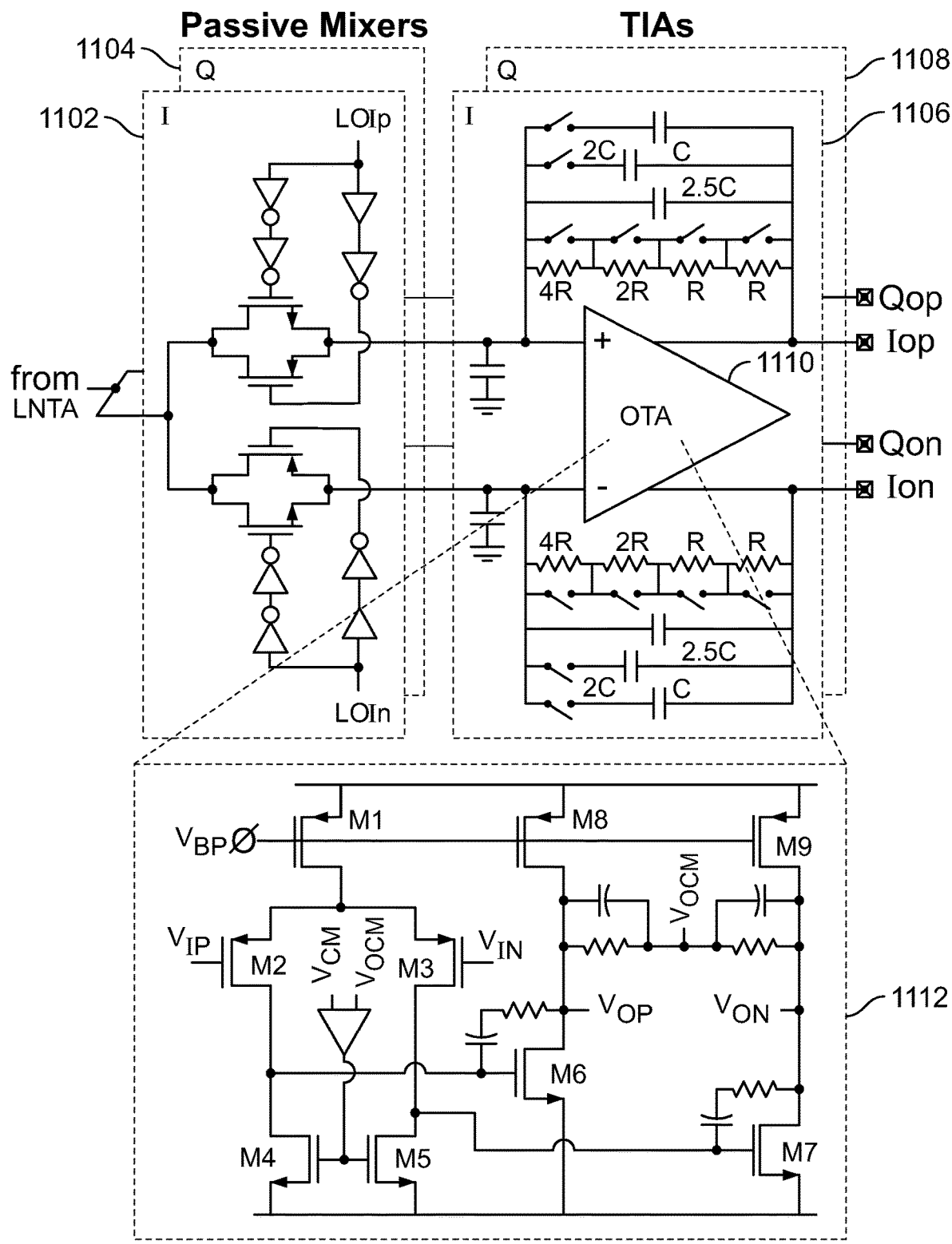
FIG. 11 is an example of a schematic of passive mixers and trans-impedance amplifiers that can be used in the receiver of FIG. 6 in accordance with some embodiments.

Turning to FIG. 11, example passive mixers 1102 and 1104 that can be used to implement passive mixers 614, 616, 624, and 626, and example trans-impedance amplifiers (TIAs) 1106 and 1108 that can be used to implement trans-impedance amplifiers (TIAs) 628, 630, 636, and 638, in accordance with some embodiments, are shown.

As illustrated, passive mixers 1102 and 1104 use transmission gates and TIAs 1106 and 1108 are implemented with two-stage Miller-compensated operational transconductance amplifiers (OTAs) 1110. An example 1112 of a schematic for OTA 1110 that can be used in some embodiments is also shown in FIG. 11. As illustrated in FIG. 11, TIAs 1106 and 1108 can use 4-bit programmable feedback resistors and 3-bit programmable feedback capacitors for gain and baseband bandwidth range control in some embodiments.

Figure 12:
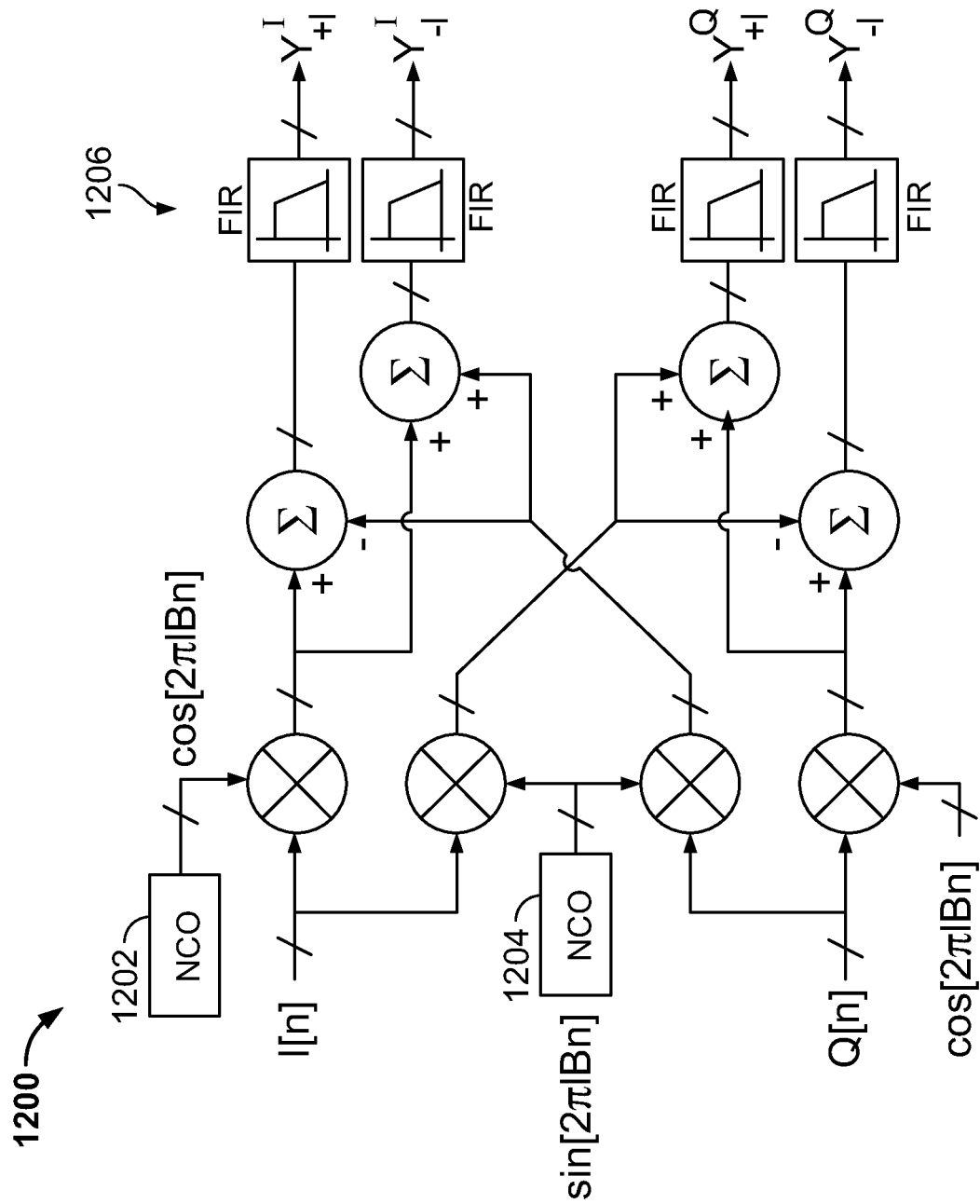
FIG. 12 is an example of a schematic of a digital baseband slice that can be used in the digital baseband circuitry of the receiver of FIG. 6 in accordance with some embodiments.

FIG. 12 illustrates an example 1200 of a digital baseband (DBB) slice that can be used to implement DBB circuits 652 and 654 (FIG. 6) in accordance with some embodiments. These DBB slices can be used to extract a higher order IF response of order l with indices +/−l, where l=1,2, . . . r. When the bandwidth $f_{TIA}$ of TIAs 628, 630, 636, and 638 (FIG. 6) is equal to B(2r+1)/2 and the frequency $f_{ADC}$ of ADCs 640, 642, 648, and 650 (FIG. 6) is greater than or equal to B(2r+1), the 2r IF responses shown in FIG. 4 can be extracted using r of the DBB slices shown in FIG. 12. The frequency of the numerically controlled oscillators (NCOs) 1202 and 1204 can be set to $f_{NCO}$=lB to extract the IF response pair with indices +/−l. The bandwidth of the FIR lowpass filters 1206 in the DBB slices can be set to $f_{FIR}$=B/2. The response at DC can be extracted without using a DBB slice by lowpass filtering I and Q with $f_{FIR}$=B/2 in some embodiments. Therefore, the two digital baseband circuits 652 and 654 shown in FIG. 6 use 4r NCOs and 4(2r+1) FIR filters.

Referring back to FIG. 6, the Orthogonal Matching Pursuit (OMP) algorithm can be used in CS DSP 656 to identify interferers in some embodiments. The OMP algorithm is a simple greedy heuristic for sparse recovery, which forms an estimate of the signal support (or occupied bins) one element at a time. It offers an attractive tradeoff between algorithm simplicity and recovery guarantees. In some embodiments, $2(2r+1)N_0$ complex multiplications and additions per detected signal can be performed in the CS DSP. Other approaches to identifying interferers in the CS DSP, such as Gradient Descent and Basis Pursuit with Denoising, can be used in some embodiments.

When in noise cancelling narrowband reception mode (mode 1), noise cancellation DSP 658 can be used to cancel noise in the outputs of the digital baseband circuits. Any suitable weights (which can be the weights determined in the calibration described above) can be used to amplify or attenuate the DBB circuit outputs, and a complex sum of the weighted outputs can be calculated to produce I and Q outputs.

Each of DSPs 656 and 658 of FIG. 6 can be implemented using any suitable hardware. For example, in some embodiments, the DSPs can be implemented using a hardware processor, which can be any suitable microprocessor, microcontroller, digital signal processor device, field programmable gate array, dedicated logic, and/or any other hardware capable of performing the functions described herein. In some embodiments, such a hardware processor can be coupled to or include any suitable memory for storing instructions and/or data for performing the functions described herein, such as any suitable random-access memory (RAM), read only memory (ROM), magnetic media, optical media, etc.

In some embodiments, any suitable computer readable media (which can be part of the memory described above) can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, etc.), non-transitory optical media (such as compact discs, digital video discs, Blu-ray discs, etc.), non-transitory semiconductor media (such as random access memory (RAM), flash memory, electrically programmable read only memory (EPROM), electrically erasable programmable read only memory (EEPROM), etc.), any suitable non-transitory media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Although the invention has been described and illustrated in the foregoing illustrative embodiments, it is understood that the present disclosure has been made only by way of example, and that numerous changes in the details of embodiment of the invention can be made without departing from the spirit and scope of the invention, which is limited only by the claims that follow. Features of the disclosed embodiments can be combined and rearranged in various ways.

What is claimed is:

1. A circuit for identifying interferers using compressed-sampling, comprising:
    a first low noise amplifier (LNA) having an input that receives a radio frequency (RF) signal and having an output;
    a first passive mixer having a first input coupled to the output of the first LNA, having a second input, and having an output;
    a first local oscillator (LO) source having an output coupled to the second input of the first passive mixer;
    a first low pass filter having an input coupled to the output of the first passive mixer and having an output;
    a first analog-to-digital converter (ADC) having an input coupled to the output of the first low pass filter and having an output;
    a first digital baseband (DBB) circuit having an input coupled to the output of the first ADC and having an output;
    a compression-sampling digital signal processor (DSP) having an input coupled to the output of the first DBB circuit and having a plurality of outputs, wherein the compression-sampling DSP is configured to output identifiers of frequency locations of interferers;
    a second passive mixer having a first input coupled to the output of the first LNA, having a second input, and having an output;
    a second local oscillator (LO) source having an output coupled to the second input of the second passive mixer;
    a second low pass filter having an input coupled to the output of the second passive mixer and having an output;
    a second analog-to-digital converter (ADC) having an input coupled to the output of the second low pass filter and having an output coupled to the input of the first DBB circuit,
    wherein, in a first mode, the first LO source outputs a first modulated LO signal that is formed by modulating a first local oscillator signal with a pseudo-random sequence, and
    wherein, in the first mode, the second LO source outputs a second modulated LO signal that is formed by modulating a second local oscillator signal with the pseudo-random sequence.

2. The circuit of claim 1, wherein the first LNA is a low noise transconductance amplifier (LNTA).

3. The circuit of claim 1, wherein the first passive mixer comprises at least one switch.

4. The circuit of claim 1, wherein the first LO source comprises:
    an LO source mixer having a first input, a second input, and an output, wherein the output is coupled to the output of the LO source;
    an LO source local oscillator having an output couple to first input of the LO source mixer; and
    a pseudo-random sequence generator having an output coupled to the second input of the LO source mixer.

5. The circuit of claim 1, wherein the first low pass filter is implemented using a trans-impedance amplifier (TIA).

6. The circuit of claim 1, wherein a frequency of the first local oscillator signal equals a frequency of the second local oscillator signal.

7. The circuit of claim 1, wherein a frequency of the first local oscillator signal is different from a frequency of the second local oscillator signal.

8. The circuit of claim 1, wherein in a second mode, the first LO source outputs the first local oscillator signal.

9. The circuit of claim 1, wherein in a third mode, the first LO source outputs a square wave modulated LO signal that is formed by modulating the first local oscillator signal with a square wave.

10. The circuit of claim 1, further comprising:
    a second low noise amplifier (LNA) having an input that receives the radio frequency (RF) signal and having an output;
    a third passive mixer having a first input coupled to the output of the second LNA, having a second input, and having an output;
    a third local oscillator (LO) source having an output coupled to the second input of the third passive mixer;
    a third low pass filter having an input coupled to the output of the third passive mixer and having an output;
    a third analog-to-digital converter (ADC) having an input coupled to the output of the third low pass filter and having an output; and
    a second digital baseband (DBB) circuit having an input coupled to the output of the third ADC and having an output,
    wherein the output of the second DBB circuit is coupled to the input of the compression-sampling digital signal processor (DSP).

11. The circuit of claim 10, wherein the first LNA is a common-source low noise transconductance amplifier (LNTA), and wherein the second LNA is a common-gate LNTA.

12. The circuit of claim 1, wherein the compression-sampling DSP is configured to perform an orthogonal matching pursuit algorithm to identify frequencies of the interferers.

13. The circuit of claim 1, wherein the pseudo-random sequence is a pseudo-random bit sequence.

14. A circuit for identifying interferers using compressed-sampling, further comprising:
    a first low noise amplifier (LNA) having an input that receives a radio frequency (RF) signal and having an output;

a first passive mixer having a first input coupled to the output of the first LNA, having a second input, and having an output;

a first local oscillator (LO) source having an output coupled to the second input of the first passive mixer;

a first low pass filter having an input coupled to the output of the first passive mixer and having an output;

a first analog-to-digital converter (ADC) having an input coupled to the output of the first low pass filter and having an output;

a first digital baseband (DBB) circuit having an input coupled to the output of the first ADC and having an output;

a compression-sampling digital signal processor (DSP) having an input coupled to the output of the first DBB circuit and having a plurality of outputs, wherein the compression-sampling DSP is configured to output identifiers of frequency locations of interferers;

a second low noise amplifier (LNA) having an input that receives the radio frequency (RF) signal and having an output;

a third passive mixer having a first input coupled to the output of the second LNA, having a second input, and having an output;

a third local oscillator (LO) source having an output coupled to the second input of the third passive mixer;

a third low pass filter having an input coupled to the output of the third passive mixer and having an output;

a third analog-to-digital converter (ADC) having an input coupled to the output of the third low pass filter and having an output; and a second digital baseband (DBB) circuit having an input coupled to the output of the third ADC and having an output, wherein, in a first mode, the first LO source outputs a first modulated LO signal that is formed by modulating a first local oscillator signal with a pseudo-random sequence, and wherein the output of the second DBB circuit is coupled to the input of the compression-sampling digital signal processor (DSP).

15. The circuit of claim 14, wherein the first LNA is a common-source low noise transconductance amplifier (LNTA), and wherein the second LNA is a common-gate LNTA.

16. The circuit of claim 14, wherein the compression-sampling DSP is configured to perform an orthogonal matching pursuit algorithm to identify frequencies of the interferers.

17. The circuit of claim 14, wherein the first LNA is a low noise transconductance amplifier (LNTA).

18. The circuit of claim 14, wherein the first passive mixer comprises at least one switch.

19. The circuit of claim 14, wherein the first LO source comprises:

an LO source mixer having a first input, a second input, and an output, wherein the output is coupled to the output of the LO source;

an LO source local oscillator having an output couple to first input of the LO source mixer; and a pseudo-random sequence generator having an output coupled to the second input of the LO source mixer.

20. The circuit of claim 14, wherein the first low pass filter is implemented using a trans-impedance amplifier (TIA).

21. The circuit of claim 14, wherein in a second mode, the first LO source outputs the first local oscillator signal.

22. The circuit of claim 14, wherein in a third mode, the first LO source outputs a square wave modulated LO signal that is formed by modulating the first local oscillator signal with a square wave.

23. The circuit of claim 14, wherein the compression-sampling DSP is configured to perform an orthogonal matching pursuit algorithm to identify frequencies of the interferers.

24. The circuit of claim 14, wherein the pseudo-random sequence is a pseudo-random bit sequence.

* * * * *